US011945232B2

(12) United States Patent
Nakano et al.

(10) Patent No.: US 11,945,232 B2
(45) Date of Patent: Apr. 2, 2024

(54) INKJET PRINTING APPARATUS AND METHOD OF CONTROLLING INKJET PRINTING APPARATUS

(71) Applicant: CANON KABUSHIKI KAISHA, Tokyo (JP)

(72) Inventors: Takatoshi Nakano, Yokohama (JP); Yoshinori Nakagawa, Kawasaki (JP); Atsushi Takahashi, Tama (JP); Takuya Fukasawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/086,750

(22) Filed: Dec. 22, 2022

(65) Prior Publication Data

US 2023/0234370 A1 Jul. 27, 2023

Related U.S. Application Data

(63) Continuation of application No. 17/328,190, filed on May 24, 2021, now Pat. No. 11,559,994, which is a (Continued)

(30) Foreign Application Priority Data

Oct. 5, 2018 (JP) ................................. 2018-189630

(51) Int. Cl.
*B41J 2/19* (2006.01)
*B41J 2/14* (2006.01)
*B41J 2/175* (2006.01)

(52) U.S. Cl.
CPC . *B41J 2/19* (2013.01); *B41J 2/14* (2013.01); *B41J 2/175* (2013.01)

(58) Field of Classification Search
CPC ....... B41J 2/19; B41J 2/14; B41J 2/175; B41J 2/18; B41J 29/38
See application file for complete search history.

(56) References Cited

U.S. PATENT DOCUMENTS 7,416,294 B2 * 8/2008 Kojima .................... B41J 2/195
347/92
2017/0239956 A1 * 8/2017 Karita ........................ B41J 2/19

FOREIGN PATENT DOCUMENTS

JP 2003182103 A 7/2003
JP 2005262876 A 9/2005
(Continued)

OTHER PUBLICATIONS

InnovationQ Plus—IP.com search (Aug. 2020) pp. 1, https://iq.ip.com/discover.
(Continued)

*Primary Examiner* — Lisa Solomon
(74) *Attorney, Agent, or Firm* — Carter, DeLuca & Farrell LLP

(57) ABSTRACT

An inkjet printing apparatus is provided with a tank that stores ink, a print head that performs print operation by ejecting ink supplied from the tank, a circulation unit that establishes a circulating state to circulate ink in a circulation path if print operation is performed and establishes a stopped state to stop circulation of ink if print operation is terminated, and a deaeration unit that performs deaeration operation to deaerate ink inside the circulation path. The apparatus includes an estimation unit that estimates a dissolved gas amount in ink inside the circulation path based on dissolved gas amounts increased in the circulating state and in the stopped state, respectively, and a control unit that causes the deaeration unit to execute deaeration operation after comple-
(Continued)

tion of print operation if the dissolved gas amount estimated by the estimation unit exceeds a predetermined threshold.

19 Claims, 24 Drawing Sheets

Related U.S. Application Data continuation of application No. 16/576,886, filed on Sep. 20, 2019, now Pat. No. 11,059,301.

(56) References Cited

FOREIGN PATENT DOCUMENTS

| | | | |
|---|---|---|---|
| JP | 2013240978 | A | 12/2013 |
| JP | 2015047716 | A | 3/2015 |
| JP | 2017148999 | A | 8/2017 |

OTHER PUBLICATIONS

IP.com search, "A printing apparatus comprising a tank configured to . . . " search completed on Sep. 27, 2022, pp. 1-2.
Notice of Reasons for Refusal issued in corresponding JP Patent Application No. 2018-189630, dated Sep. 13, 2022, pp. 1-5, with English translation.
Notice of Reasons for Refusal issued by the Japanese Patent Office on Dec. 19, 2023 in corresponding JP Patent Application No. 2022-197715, with English translation.

* cited by examiner

INKJET PRINTING APPARATUS AND METHOD OF CONTROLLING INKJET PRINTING APPARATUS

CROSS REFERENCE TO RELATED APPLICATIONS

This application is a continuation of U.S. patent application Ser. No. 17/328,190, filed on May 24, 2021, which is a continuation of U.S. patent application Ser. No. 16/576,886, filed on Sep. 20, 2019, which claims the benefit of and priority to Japanese Patent Application No. 2018-189630, filed on Oct. 5, 2018, each of which is hereby incorporated by reference herein in their entirety.

BACKGROUND OF THE INVENTION

Field of the Invention

The present invention relates to an inkjet printing apparatus and a method of controlling an inkjet printing apparatus.

Description of the Related Art

An inkjet printing apparatus performs printing by ejecting ink from an ejection opening surface provided on a print head. Here, if bubbles are contained in ink, the bubbles may cause problems such as clogging of the ejection openings, thus degrading an ejection performance. This is why a dissolved gas in ink is subjected to deaeration.

Japanese Patent Laid-Open No. 2005-262876 (hereinafter referred to as Reference 1) discloses an inkjet printing apparatus in which ink circulates between a sub-tank and a print head. Moreover, Reference 1 describes a technique for estimating an amount of dissolved gas in ink from ink circulation time and executing deaeration in a case where the estimated amount of dissolved gas exceeds a prescribed value.

There is a case where short print jobs are continuously repeated while interposing intermission periods each lasting for several minutes. For example, circulation takes place in response to print operation for a first print job, and the circulation is stopped at the time of completion of the printing. Several minutes later, the circulation takes place in response to print operation for a second print job, and the circulation is stopped at the time of completion of the printing. If operation mentioned above is continuously repeated, the technique according to Reference 1 configured to estimate the amount of dissolved gas in ink while taking only the ink circulation time into account does not consider the amount of dissolved gas which is likely to increase while the circulation is stopped. As a consequence, this technique has the risk of a failure to appropriately estimate the amount of dissolved gas, allowing generation of bubbles in the print head, and thereby complicating the normal ejection.

SUMMARY OF THE INVENTION

An inkjet printing apparatus according to an aspect of the present invention is provided with a tank configured to store ink, a print head configured to perform a print operation by ejecting ink supplied from the tank, a circulation unit configured to establish a circulating state in which ink is put into circulation in a circulation path including the tank and the print head in a case where the print operation is performed, and to establish a stopped state in which the circulation of ink in the circulation path is stopped in a case where the print operation is terminated, and a deaeration unit configured to perform a deaeration operation to deaerate ink inside the circulation path. The inkjet printing apparatus includes: an estimation unit configured to estimate an amount of dissolved gas in ink inside the circulation path based on an amount of dissolved gas to be increased in the circulating state and on an amount of dissolved gas to be increased in the stopped state; and a control unit configured to cause the deaeration unit to execute the deaeration operation after completion of the print operation in a case where the amount of dissolved gas estimated by the estimation unit exceeds a predetermined threshold.

Further features of the present invention will become apparent from the following description of exemplary embodiments with reference to the attached drawings.

BRIEF DESCRIPTION OF THE DRAWINGS

FIG. 20 is a diagram showing the relationship of FIGS. 20A and 20B;

DESCRIPTION OF THE EMBODIMENTS

Figure 1:
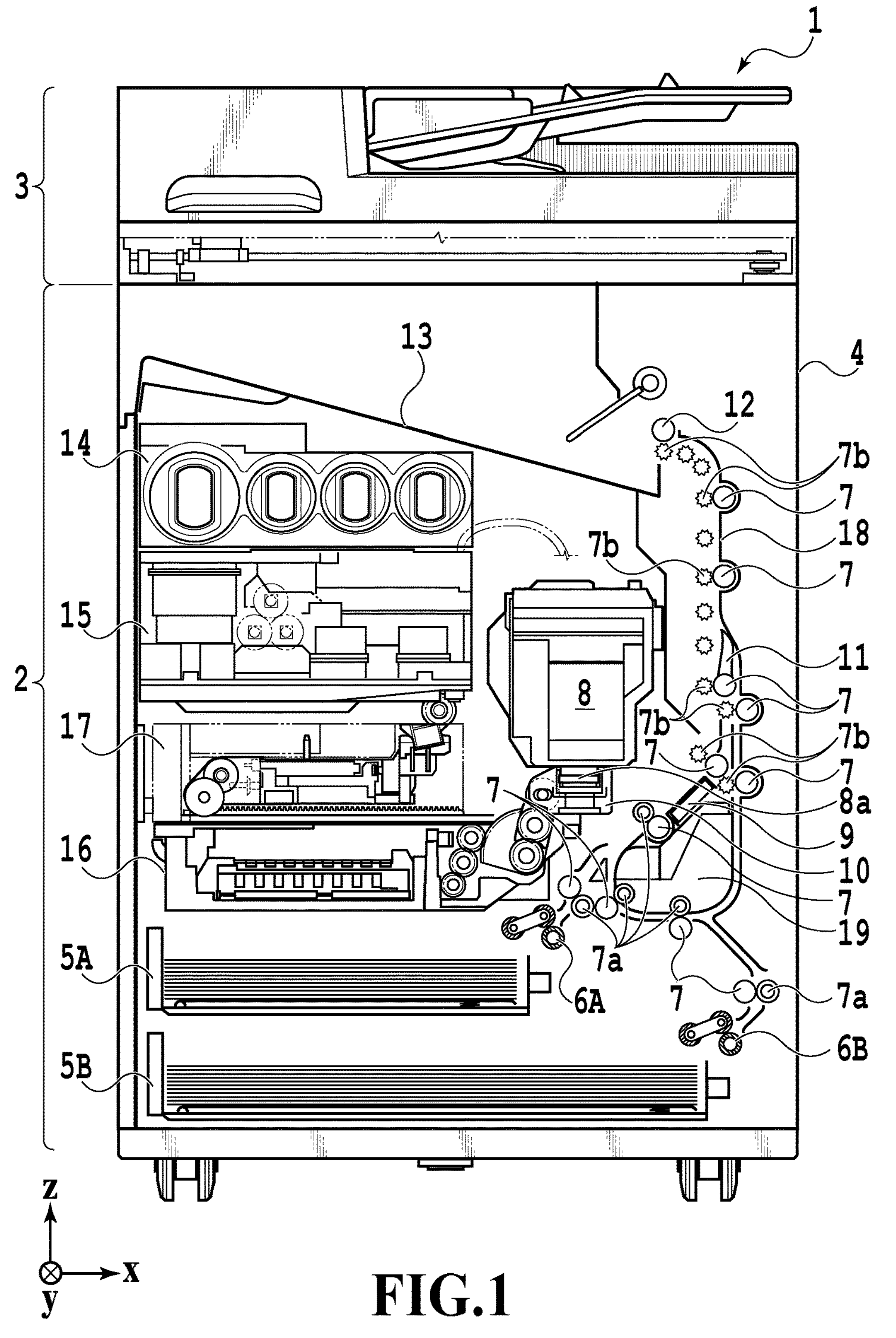
FIG. 1 is a diagram showing a printing apparatus in a standby state.

Embodiments of the present invention will be described below with reference to the drawings. It should be noted that the following embodiments do not limit the present invention and that not all of the combinations of the characteristics described in the present embodiments are essential for solving the problem to be solved by the present invention. Incidentally, the same reference numeral refers to the same component in the following descriptions. Furthermore, relative positions, shapes, and the like of the constituent elements described in the embodiments are exemplary only and are not intended to limit the scope of the invention.

First Embodiment

FIG. 1 is an internal configuration diagram of an inkjet printing apparatus 1 (hereinafter "printing apparatus 1") used in the present embodiment. In the drawings, an x-direction is a horizontal direction, a y-direction (a direction perpendicular to paper) is a direction in which ejection openings are arrayed in a print head 8 described later, and a z-direction is a vertical direction.

The printing apparatus 1 is a multifunction printer comprising a print unit 2 and a scanner unit 3. The printing apparatus 1 can use the print unit 2 and the scanner unit 3 separately or in synchronization to perform various processes related to print operation and scan operation. The scanner unit 3 comprises an automatic document feeder (ADF) and a flatbed scanner (FBS) and is capable of scanning a document automatically fed by the ADF as well as scanning a document placed by a user on a document plate of the FBS. The present embodiment is directed to the multifunction printer comprising both the print unit 2 and the scanner unit 3, but the scanner unit 3 may be omitted. FIG. 1 shows the printing apparatus 1 in a standby state in which neither print operation nor scan operation is performed.

In the print unit 2, a first cassette 5A and a second cassette 5B for housing a print medium (cut sheet) S are detachably provided at the bottom of a casing 4 in the vertical direction. A relatively small print medium of up to A4 size is placed flat and housed in the first cassette 5A and a relatively large print medium of up to A3 size is placed flat and housed in the second cassette 5B. A first feeding unit 6A for sequentially feeding a housed print medium is provided near the first cassette 5A. Similarly, a second feeding unit 6B is provided near the second cassette 5B. In print operation, a print medium S is selectively fed from either one of the cassettes.

Conveying rollers 7, a discharging roller 12, pinch rollers 7*a*, spurs 7*b*, a guide 18, an inner guide 19, and a flapper 11 are conveying mechanisms for guiding a print medium S in a predetermined direction. The conveying rollers 7 are drive rollers located upstream and downstream of the print head 8 and driven by a conveying motor (not shown). The pinch rollers 7*a* are follower rollers that are turned while nipping a print medium S together with the conveying rollers 7. The discharging roller 12 is a drive roller located downstream of the conveying rollers 7 and driven by the conveying motor (not shown). The spurs 7*b* nip and convey a print medium S together with the conveying rollers 7 and discharging roller 12 located downstream of the print head 8.

The guide 18 is provided in a conveying path of a print medium S to guide the print medium S in a predetermined direction. The inner guide 19 is a member extending in the y-direction. The inner guide 19 has a curved side surface and guides a print medium S along the side surface. The flapper 11 is a member for changing a direction in which a print medium S is conveyed in duplex print operation. A discharging tray 13 is a tray for placing and housing a print medium S that was subjected to print operation and discharged by the discharging roller 12.

The print head 8 of the present embodiment is a full line type color inkjet print head. In the print head 8, a plurality of ejection openings configured to eject ink based on print data are arrayed in the y-direction in FIG. 1 so as to correspond to the width of a print medium S. In other words, the print head 8 is configured to be capable of ejecting ink of a plurality of colors. In a case where the print head 8 is in a standby position, an ejection opening surface 8*a* of the print head 8 is oriented vertically downward and capped with a cap unit 10 as shown in FIG. 1. In print operation, the orientation of the print head 8 is changed by a print controller 202 described later such that the ejection opening surface 8*a* faces a platen 9. The platen 9 includes a flat plate extending in the y-direction and supports, from the back side, a print medium S subjected to print operation by the print head 8. The movement of the print head 8 from the standby position to a printing position will be described later in detail.

An ink tank unit 14 separately stores ink of four colors to be supplied to the print head 8. An ink supply unit 15 is provided in the midstream of a flow path connecting the ink tank unit 14 to the print head 8 to adjust the pressure and flow rate of ink in the print head 8 within a suitable range. The present embodiment adopts a circulation type ink supply system, where the ink supply unit 15 adjusts the pressure of ink supplied to the print head 8 and the flow rate of ink collected from the print head 8 within a suitable range.

A maintenance unit 16 comprises the cap unit 10 and a wiping unit 17 and activates them at predetermined timings to perform maintenance operation for the print head 8.

Figure 2:
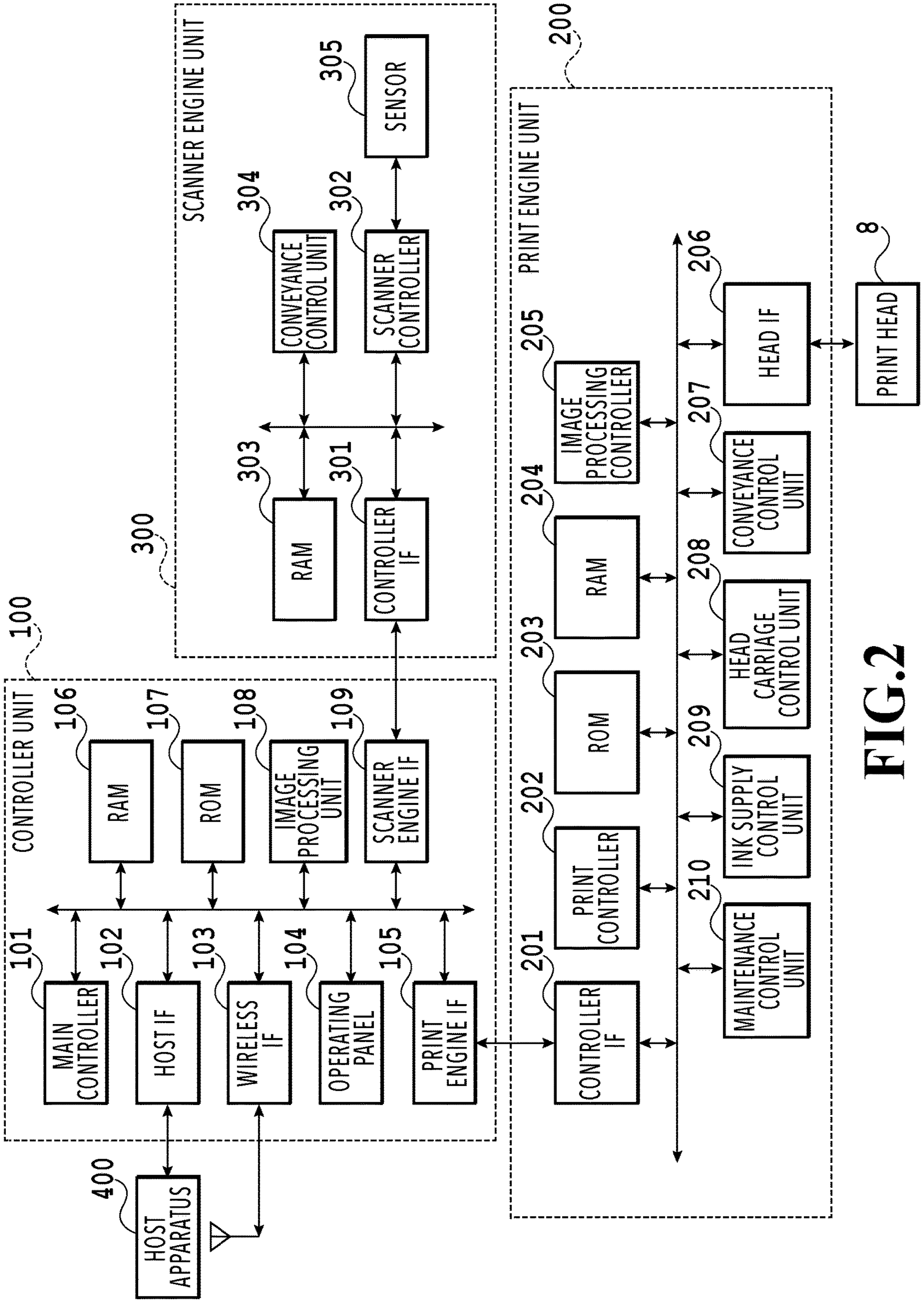
FIG. 2 is a control block diagram of the printing apparatus.

FIG. 2 is a block diagram showing a control configuration in the printing apparatus 1. The control configuration mainly includes a print engine unit 200 that exercises control over the print unit 2, a scanner engine unit 300 that exercises control over the scanner unit 3, and a controller unit 100 that exercises control over the entire printing apparatus 1. A print controller 202 controls various mechanisms of the print engine unit 200 under instructions from a main controller 101 of the controller unit 100. Various mechanisms of the scanner engine unit 300 are controlled by the main controller 101 of the controller unit 100. The control configuration will be described below in detail.

In the controller unit 100, the main controller 101 including a CPU controls the entire printing apparatus 1 using a RAM 106 as a work area in accordance with various parameters and programs stored in a ROM 107. For example, in a case where a print job is input from a host apparatus 400 via a host I/F 102 or a wireless I/F 103, an image processing unit 108 executes predetermined image processing for received image data under instructions from the main controller 101. The main controller 101 transmits the image data subjected to the image processing to the print engine unit 200 via a print engine I/F 105.

The printing apparatus 1 may acquire image data from the host apparatus 400 via a wireless or wired communication or acquire image data from an external storage unit (such as a USB memory) connected to the printing apparatus 1. A communication system used for the wireless or wired communication is not limited. For example, as a communication system for the wireless communication, Wi-Fi (Wireless Fidelity; registered trademark) and Bluetooth (registered trademark) can be used. As a communication system for the wired communication, a USB (Universal Serial Bus) and the like can be used. For example, if a scan command is input from the host apparatus 400, the main controller 101 transmits the command to the scanner unit 3 via a scanner engine I/F 109.

An operating panel 104 is a mechanism to allow a user to do input and output for the printing apparatus 1. A user can give an instruction to perform operation such as copying and scanning, set a print mode, and recognize information about the printing apparatus 1 via the operating panel 104.

In the print engine unit 200, the print controller 202 including a CPU controls various mechanisms of the print unit 2 using a RAM 204 as a work area in accordance with various parameters and programs stored in a ROM 203. Once various commands and image data are received via a controller I/F 201, the print controller 202 temporarily stores them in the RAM 204. The print controller 202 allows an image processing controller 205 to convert the stored image data into print data such that the print head 8 can use it for print operation. After the generation of the print data, the print controller 202 allows the print head 8 to perform print operation based on the print data via a head I/F 206. At this time, the print controller 202 conveys a print medium S by driving the feeding units 6A and 6B, conveying rollers 7, discharging roller 12, and flapper 11 shown in FIG. 1 via a conveyance control unit 207. The print head 8 performs print operation in synchronization with the conveyance operation of the print medium S under instructions from the print controller 202, thereby performing printing.

A head carriage control unit 208 changes the orientation and position of the print head 8 in accordance with an operating state of the printing apparatus 1 such as a maintenance state or a printing state. An ink supply control unit 209 controls the ink supply unit 15 such that the pressure of ink supplied to the print head 8 is within a suitable range. A maintenance control unit 210 controls the operation of the cap unit 10 and wiping unit 17 in the maintenance unit 16 at the time of performing maintenance operation for the print head 8.

In the scanner engine unit 300, the main controller 101 controls hardware resources of the scanner controller 302 using the RAM 106 as a work area in accordance with various parameters and programs stored in the ROM 107, thereby controlling various mechanisms of the scanner unit 3. For example, the main controller 101 controls hardware resources in the scanner controller 302 via a controller I/F 301 to cause a conveyance control unit 304 to convey a document placed by a user on the ADF and cause a sensor 305 to scan the document. The scanner controller 302 stores scanned image data in a RAM 303. The print controller 202 can convert the image data acquired as described above into print data to enable the print head 8 to perform print operation based on the image data scanned by the scanner controller 302.

Figure 3:
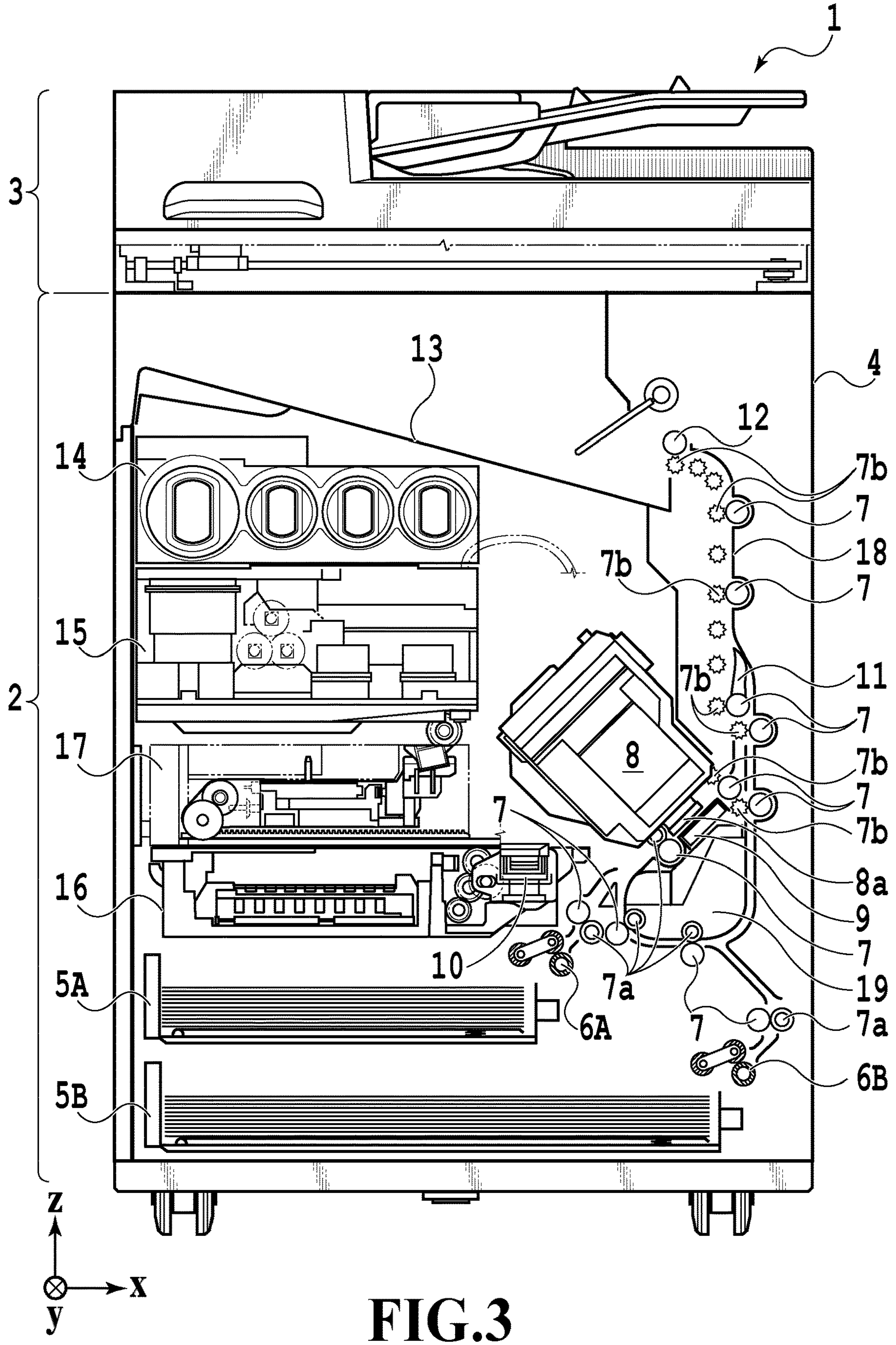
FIG. 3 is a diagram showing the printing apparatus in a printing state.

FIG. 3 shows the printing apparatus 1 in a printing state. As compared with the standby state shown in FIG. 1, the cap unit 10 is separated from the ejection opening surface 8*a* of the print head 8 and the ejection opening surface 8*a* faces the platen 9. In the present embodiment, the plane of the platen 9 is inclined at about 45° with respect to the horizontal plane. The ejection opening surface 8*a* of the print head 8 in a printing position is also inclined at about 45° with respect to the horizontal plane so as to keep a constant distance from the platen 9.

In the case of moving the print head 8 from the standby position shown in FIG. 1 to the printing position shown in FIG. 3, the print controller 202 uses the maintenance control unit 210 to move the cap unit 10 down to an evacuation position shown in FIG. 3, thereby separating the cap member 10*a* from the ejection opening surface 8*a* of the print head 8. The print controller 202 then uses the head carriage control unit 208 to turn the print head 8 by 45° while adjusting the vertical height of the print head 8 such that the ejection opening surface 8*a* faces the platen 9. After the completion of print operation, the print controller 202 reverses the above procedure to move the print head 8 from the printing position to the standby position.

Figure 4:
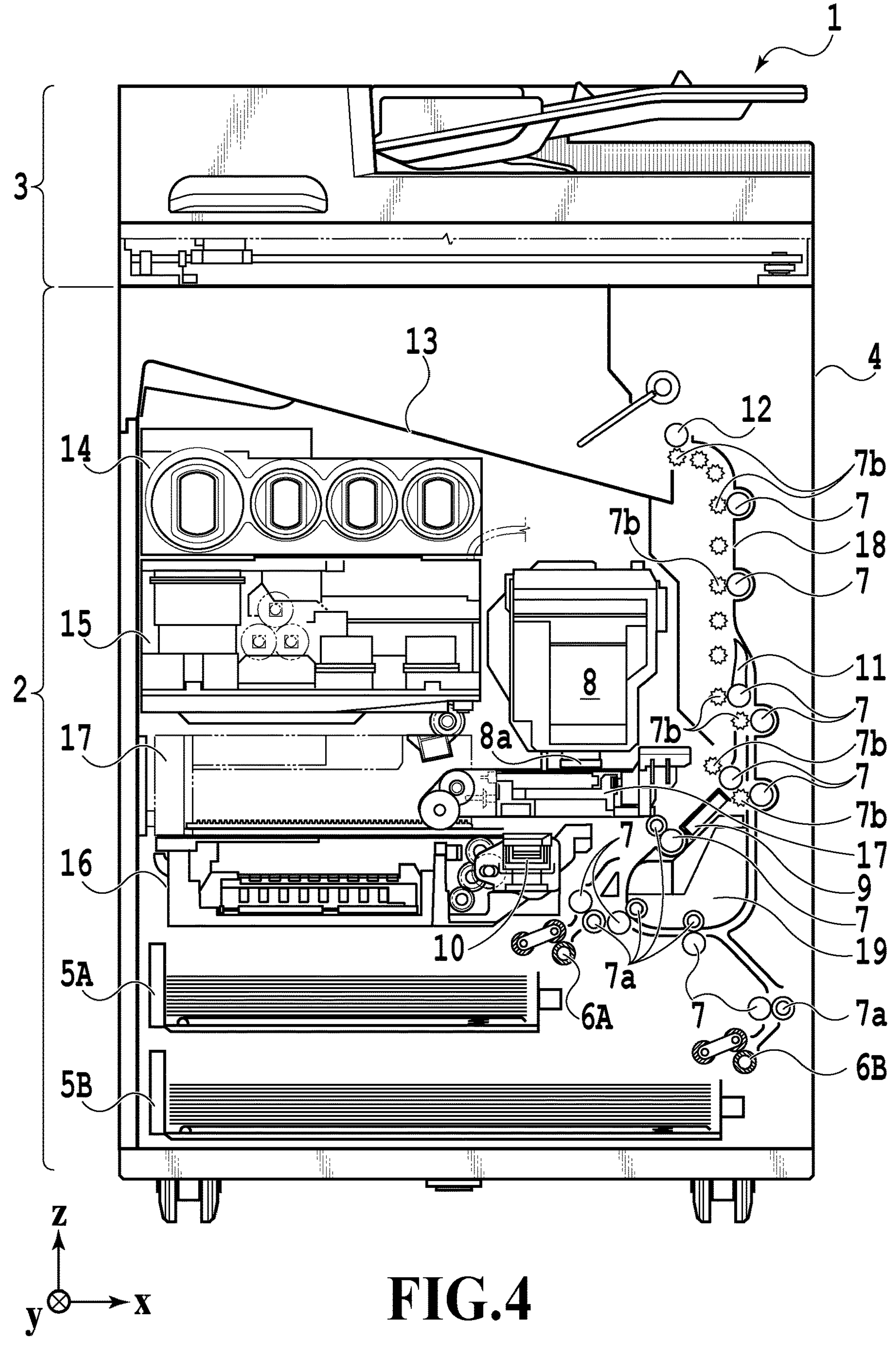
FIG. 4 is a diagram showing the printing apparatus in a state of maintenance.

FIG. 4 is a diagram showing the printing apparatus 1 in a maintenance state. In the case of moving the print head 8 from the standby position shown in FIG. 1 to a maintenance position shown in FIG. 4, the print controller 202 moves the print head 8 vertically upward and moves the cap unit 10 vertically downward. The print controller 202 then moves the wiping unit 17 from the evacuation position to the right in FIG. 4. After that, the print controller 202 moves the print head 8 vertically downward to the maintenance position where maintenance operation can be performed.

On the other hand, in the case of moving the print head 8 from the printing position shown in FIG. 3 to the maintenance position shown in FIG. 4, the print controller 202 moves the print head 8 vertically upward while turning it by 45°. The print controller 202 then moves the wiping unit 17 from the evacuation position to the right. Following that, the print controller 202 moves the print head 8 vertically downward to the maintenance position where maintenance operation can be performed by the maintenance unit 16.

(Ink Supply Unit (Circulation System))

Figure 5:
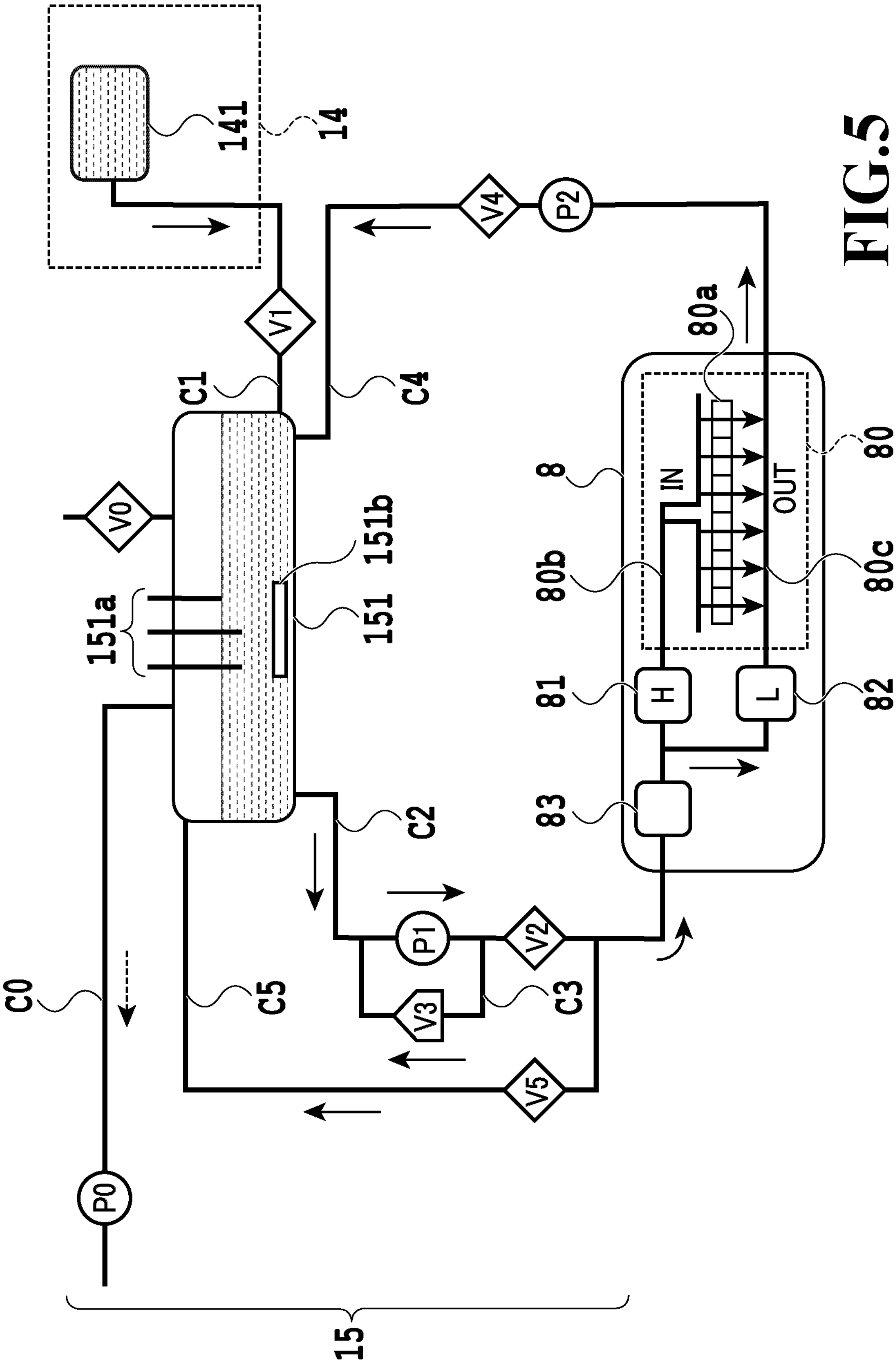
FIG. 5 is a diagram showing a flow path configuration of an ink circulation system.

FIG. 5 is a diagram including the ink supply unit 15 adopted in the printing apparatus 1 of the present embodiment. With reference of FIG. 5, a flow path configuration of an ink circulation system of the present embodiment will be described. The ink supply unit 15 supplies ink from the ink tank unit 14 to the print head 8 (head unit). In the diagram, a configuration of one color ink is shown, but such a configuration is practically prepared for each color ink. The ink supply unit 15 is basically controlled by the ink supply control unit 209 shown in FIG. 2. Each configuration of the ink supply unit 15 will be described below.

Ink is circulated mainly between a sub-tank 151 and the print head 8. In the print head 8, ink ejection operation is performed based on image data and ink that has not been ejected is collected and flows back to the sub-tank 151.

The sub-tank 151 in which a certain amount of ink is contained is connected to a supply flow path C2 for supplying ink to the print head 8 and to a collection flow path C4 for collecting ink from the print head 8. In other words, a circulation flow path (circulation path) for circulating ink is composed of the sub-tank 151, the supply flow path C2, the print head 8, and the collection flow path C4. Further, the sub-tank 151 is connected to a flow path C0 in which air flows.

In the sub-tank 151, a liquid level detection unit 151*a* composed of a plurality of electrode pins is provided. The ink supply control unit 209 detects presence/absence of a conducting current between those pins so as to grasp a height of an ink liquid level, that is, an amount of remaining ink inside the sub-tank 151. In addition, the sub-tank 151 is provided with a stir bar 151*b*. A vacuum pump P0 (an intra-tank decompression pump) is a negative pressure generating source for reducing pressure inside the sub-tank 151. An atmosphere release valve V0 is a valve for switching between whether or not to make the inside of the sub-tank 151 communicate with atmosphere.

A main tank 141 is a tank that contains ink which is to be supplied to the sub-tank 151. The main tank 141 is made of a flexible member, and the volume change of the flexible member allows filling the sub-tank 151 with ink. The main tank 141 has a configuration removable from the printing apparatus body. In the midstream of a tank connection flow path C1 connecting the sub-tank 151 and the main tank 141, a tank supply valve V1 for switching connection between the sub-tank 151 and the main tank 141 is provided.

Under the above configuration, once the liquid level detection unit 151*a* detects that ink inside the sub-tank 151 is less than the certain amount, the ink supply control unit 209 closes the atmosphere release valve V0, a supply valve V2, a collection valve V4, and a head replacement valve V5 and opens the tank supply valve V1. In this state, the ink supply control unit 209 causes the vacuum pump P0 to operate. Then, the inside of the sub-tank 151 is to have a negative pressure and ink is supplied from the main tank 141 to the sub-tank 151. Once the liquid level detection unit 151*a* detects that the amount of ink inside the sub-tank 151 is more than the certain amount, the ink supply control unit 209 closes the tank supply valve V1 and stops the vacuum pump P0.

The supply flow path C2 is a flow path for supplying ink from the sub-tank 151 to the print head 8, and a supply pump P1 and the supply valve V2 are arranged in the midstream of the supply flow path C2. During print operation, driving the supply pump P1 in the state of the supply valve V2 being open allows ink circulation in the circulation path while supplying ink to the print head 8. The amount of ink to be ejected per unit time by the print head 8 varies according to image data. A flow rate of the supply pump P1 is determined so as to be adaptable even in a case where the print head 8 performs ejection operation in which ink consumption amount per unit time becomes maximum.

A relief flow path C3 is a flow path which is located in the upstream of the supply valve V2 and which connects the upstream and downstream of the supply pump P1. In the midstream of the relief flow path C3, a relief valve V3 which is a differential pressure valve is provided. The relief valve is not opened or closed with a drive mechanism. Instead, the relief valve is biased with a spring and configured such that the valve is opened in a case where an applied pressure reaches a prescribed level. For example, in a case where an amount of ink supply from the supply pump P1 per unit time is larger than the total value of an ejection amount of the print head 8 per unit time and a flow rate (ink drawing amount) in a collection pump P2 per unit time, the relief valve V3 is opened according to a pressure applied to its own. As a result, a cyclic flow path composed of a portion of the supply flow path C2 and the relief flow path C3 is formed. By providing the configuration of the above relief flow path C3, the amount of ink supply to the print head 8 is adjusted according to the ink consumption amount by the print head 8 so as to stabilize a pressure inside the circulation path irrespective of image data.

The collection flow path C4 is a flow path for collecting ink from the print head 8, back to the sub-tank 151. Further, the collection pump P2 and the collection valve V4 are arranged in the midstream of the collection flow path C4. At the time of ink circulation within the circulation path, the collection pump P2 sucks ink from the print head 8 by serving as a negative pressure generating source. By driving the collection pump P2, an appropriate differential pressure is generated between an IN flow path 80*b* and an OUT flow path 80*c* inside the print head 8, thereby causing ink to circulate between the IN flow path 80*b* and the OUT flow path 80*c*.

The collection valve V4 is a valve for preventing a backflow at the time of not performing print operation, that is, at the time of not circulating ink within the circulation path. In the circulation path of the present embodiment, the sub-tank 151 is disposed higher than the print head 8 in a vertical direction (see FIG. 1). For this reason, in a case where the supply pump P1 and the collection pump P2 are not driven, there may be a possibility that ink flows back from the sub-tank 151 to the print head 8 due to a water head difference between the sub-tank 151 and the print head 8. In order to prevent such a backflow, the present embodiment provides the collection valve V4 in the collection flow path C4.

Similarly, at the time of not performing print operation, that is, at the time of not circulating ink within the circulation path, the supply valve V2 also functions as a valve for preventing ink supply from the sub-tank 151 to the print head 8.

A head replacement flow path C5 is a flow path connecting the supply flow path C2 and an air chamber (a space in which ink is not contained) of the sub-tank 151, and in its midstream, the head replacement valve V5 is provided. One end of the head replacement flow path C5 is connected to the upstream of the print head 8 in the supply flow path C2, and arranged in the downstream relative to the supply valve V2. The other end of the head replacement flow path C5 is connected to an upper part of the sub-tank 151 in the direction of gravity, so as to communicate with the air chamber inside the sub-tank 151. The head replacement flow path C5 is used in the case of pulling out ink from the print head 8 in use such as upon replacing the print head 8 or transporting the printing apparatus 1. The head replacement valve V5 is controlled by the ink supply control unit 209 so as to be closed except for a case of ink filling in the printing apparatus 1 and a case of pulling out ink from the print head 8.

Next, a flow path configuration inside the print head 8 will be described. Ink supplied from the supply flow path C2 to the print head 8 passes through a filter 83 and then is supplied to a first negative pressure control unit 81 and a second negative pressure control unit 82. The first negative pressure control unit 81 is set to have a control pressure of a low negative pressure (a negative pressure with a small difference in pressure from an atmospheric pressure). The second negative pressure control unit 82 is set to have a control pressure of a high negative pressure (a negative pressure with a large difference in pressure from the atmospheric pressure). Pressures in those first negative pressure control unit 81 and second negative pressure control unit 82 are generated within a proper range by the driving of the collection pump P2.

In an ink ejection unit 80, a printing element substrate 80*a* in which a plurality of ejection openings are arrayed is arranged in plural to form an elongate ejection opening array. A common supply flow path 80*b* (IN flow path) for guiding ink supplied from the first negative pressure control unit 81 and a common collection flow path 80*c* (OUT flow path) for guiding ink supplied from the second negative pressure control unit 82 also extend in an arranging direction of the printing element substrates 80*a*. Furthermore, in the individual printing element substrates 80*a*, individual supply flow paths connected to the common supply flow path 80*b* and individual collection flow paths connected to the common collection flow path 80*c* are formed. Accordingly, in each of the printing element substrates 80*a*, an ink flow is generated such that ink flows in from the common supply flow path 80*b* which has relatively lower negative pressure and flows out to the common collection flow path 80*c* which has relatively higher negative pressure. In the midstream of a path between the individual supply flow path and the individual collection flow path, a pressure chamber which is communicated with each ejection opening and which is filled with ink is provided. An ink flow is generated in the ejection opening and the pressure chamber even in a case where printing is not performed. Once the ejection operation is performed in the printing element substrate 80*a*, a part of ink moving from the common supply flow path 80*b* to the common collection flow path 80*c* is ejected from the ejection opening and is consumed. Meanwhile, ink not having been ejected moves toward the collection flow path C4 via the common collection flow path 80*c*.

Figure 6A:
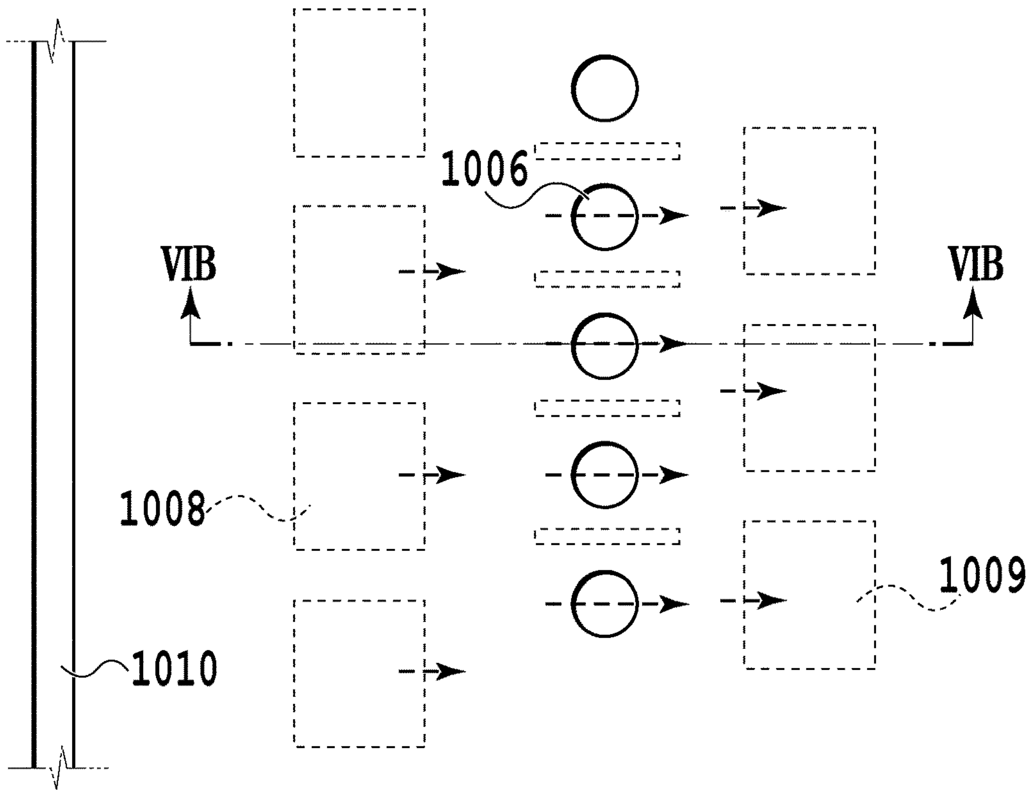
FIGS. 6A and 6B are diagrams for explaining ejection openings and pressure chambers.
Figure 6B:
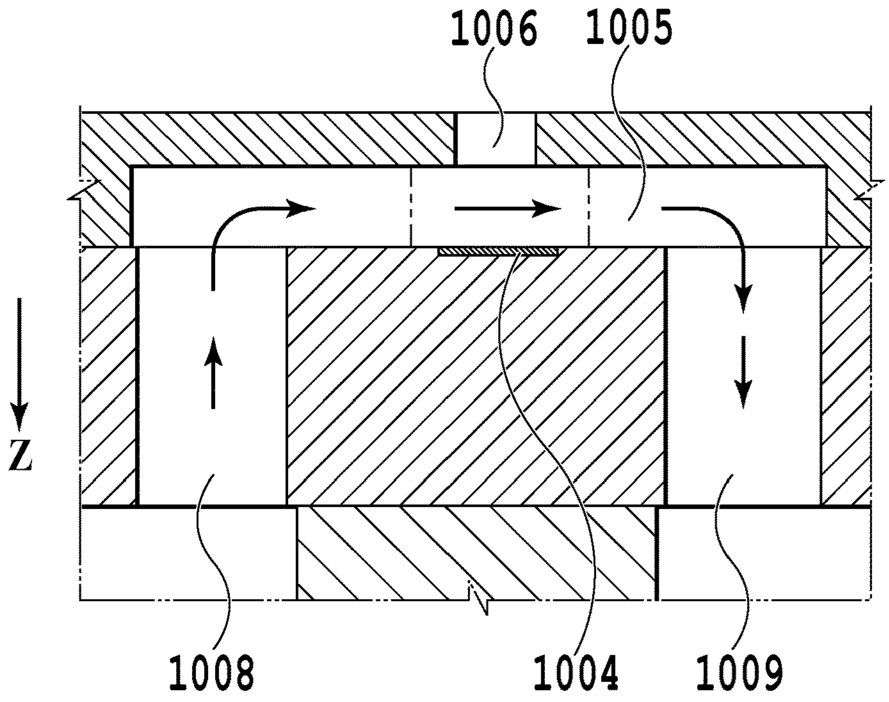

FIG. 6A is a plan schematic view enlarging a part of the printing element substrate 80*a*, and FIG. 6B is a sectional schematic view of a cross section taken from line VIB-VIB of FIG. 6A. In the printing element substrate 80*a*, a pressure chamber 1005 which is filled with ink and an ejection opening 1006 from which ink is ejected are provided. In the pressure chamber 1005, a printing element 1004 is provided at a position facing the ejection opening 1006. Further, in the printing element substrate 80*a*, a plurality of ejection openings 1006 are formed, each of which is connected to an individual supply flow path 1008 which is connected to the common supply flow path 80*b* and an individual collection flow path 1009 which is connected to the common collection flow path 80*c*.

According to the above configuration, in the printing element substrate 80*a*, an ink flow is generated such that ink flows in from the common supply flow path 80*b* which has relatively lower negative pressure (high pressure) and flows out to the common collection flow path 80*c* which has relatively higher negative pressure (low pressure). To be more specific, ink flows in the order of the common supply flow path 80*b*, the individual supply flow path 1008, the pressure chamber 1005, the individual collection flow path 1009, and the common collection flow path 80*c*. Once ink is ejected by the printing element 1004, part of ink moving from the common supply flow path 80*b* to the common collection flow path 80*c* is ejected from the ejection opening 1006 to be discharged outside the print head 8. Meanwhile, ink not having been ejected from the ejection opening 1006 is collected and flows into the collection flow path C4 via the common collection flow path 80*c*.

Moreover, the printing element substrate 80*a* includes a sub-heater 1010 which is controlled by the ink supply control unit 209. Processing for controlling a temperature of ink inside the print head 8 is performed by heating either the print head 8 or ink inside the print head 8 with the sub-heater 1010 such that ink is stably ejected from the ejection opening 1006 during the printing.

Under the above configuration, in performing print operation, the ink supply control unit 209 closes the tank supply valve V1 and the head replacement valve V5 and opens the atmosphere release valve V0, the supply valve V2, and the collection valve V4 to drive the supply pump P1 and the collection pump P2. As a result, the circulation path in the order of the sub-tank 151, the supply flow path C2, the print head 8, the collection flow path C4, and the sub-tank 151 is established. In a case where an amount of ink supply from the supply pump P1 per unit time is larger than the total value of an ejecting amount of the print head 8 per unit time and a flow rate in the collection pump P2 per unit time, ink flows from the supply flow path C2 into the relief flow path C3. As a result, the flow rate of ink from the supply flow path C2 to the print head 8 is adjusted.

In the case of not performing print operation, the ink supply control unit 209 stops the supply pump P1 and the collection pump P2 and closes the atmosphere release valve V0, the supply valve V2, and the collection valve V4. As a result, the ink flow inside the print head 8 stops and the backflow caused by the water head difference between the sub-tank 151 and the print head 8 is suppressed. Further, by closing the atmosphere release valve V0, ink leakage and ink evaporation from the sub-tank 151 are suppressed.

Meanwhile, in the case of performing deaeration operation, the ink supply control unit 209 stops the supply pump P1 and the collection pump P2, closes the atmosphere release valve V0, the supply valve V2, the collection valve V4, and the head replacement valve V5, and drives the vacuum pump P0. Thereafter, the ink supply control unit 209 stirs ink inside the sub-tank 151 by driving the stir bar 151*b* in the state where a predetermined negative pressure is generated inside the sub-tank 151. In this way, processing for deaerating the gas dissolved in ink inside the sub-tank 151 is performed. Deaeration control is conducted by the print controller 202 and the ink supply control unit 209 executes deaeration in response to an instruction from the print controller 202.

(Description of Deaeration)

Next, the deaeration processing will be described. In this embodiment, the print head 8 is subjected to temperature control by using the sub-heater 1010 during print operation. In this embodiment, the temperature control is performed so as to set the temperature at 40° C. Here, a saturated dissolved oxygen concentration (a saturated concentration of dissolved gas) in ink varies with the temperature. To be more precise, the saturated dissolved oxygen concentration becomes higher as the temperature is lower. The temperature at 40° C. as a target value for the temperature control is higher than a typical environmental temperature. Accordingly, the saturated dissolved oxygen concentration in ink in the flow path inside the print head 8 subjected to the temperature control becomes lower than the saturated dissolved oxygen concentration in ink at the typical environmental temperature.

During print operation, ink having the saturated dissolved oxygen concentration at a temperature near the environmental temperature is continuously supplied from the sub-tank 151 to the print head 8 that is subjected to the temperature control at 40° C. In other words, ink that dissolves a larger amount of oxygen than an allowable amount of oxygen to be dissolved in ink inside the flow path of the print head 8 is continuously supplied to the print head 8. As a consequence, dissolved oxygen comes out of ink in the vicinity of the print head 8 and a bubble expands inside the flow path of the print head 8, thereby causing a state of being unable to perform normal ejection.

For this reason, this embodiment performs deaeration operation such that the saturated dissolved oxygen concentration of ink does not exceed a predetermined value. Here, the dissolved oxygen concentration inside the sub-tank 151 is temporarily reduced by decompressing the sub-tank 151 and stirring ink inside the sub-tank 151. However, the air is present in each location inside the sub-tank 151, the circulation flow path, and the print head 8. Accordingly, oxygen gradually gets dissolved in ink even in the case where circulation operation is taking place and in the case where circulation operation is not taking place (hereinafter expressed as "leaving to stand" or "circulation is stopped"). For this reason, the dissolved oxygen concentration is increased over time. It is therefore necessary to execute deaeration operation at a predetermined timing.

Figure 7A:
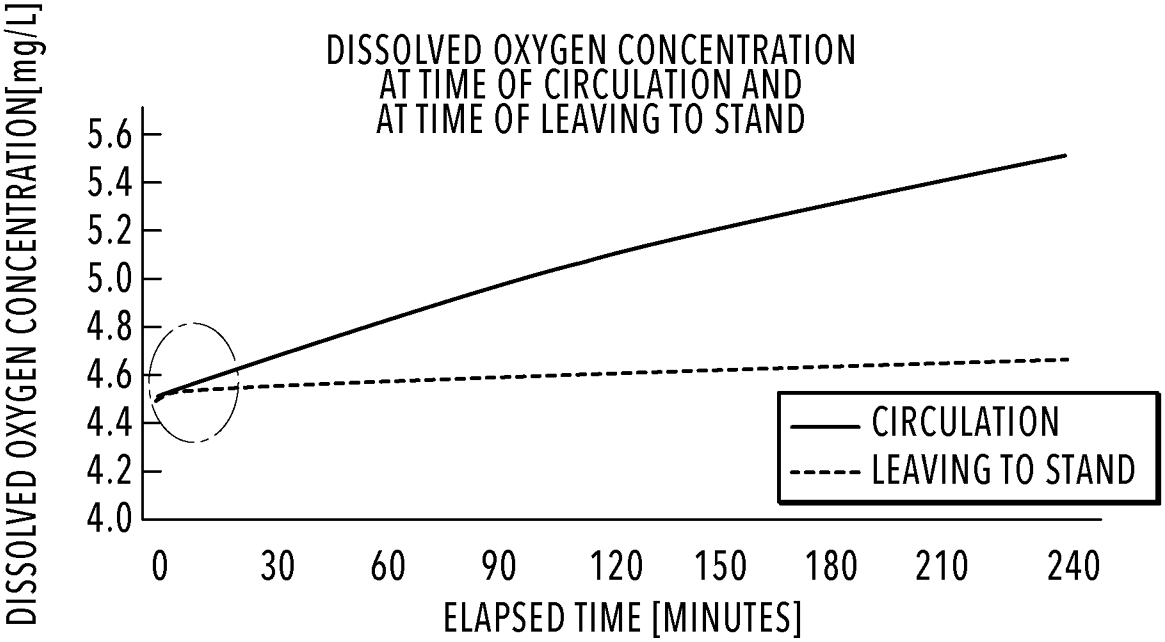
FIGS. 7A and 7B are graphs showing an aspect of an increase in dissolved oxygen concentration after deaeration.
Figure 7B:
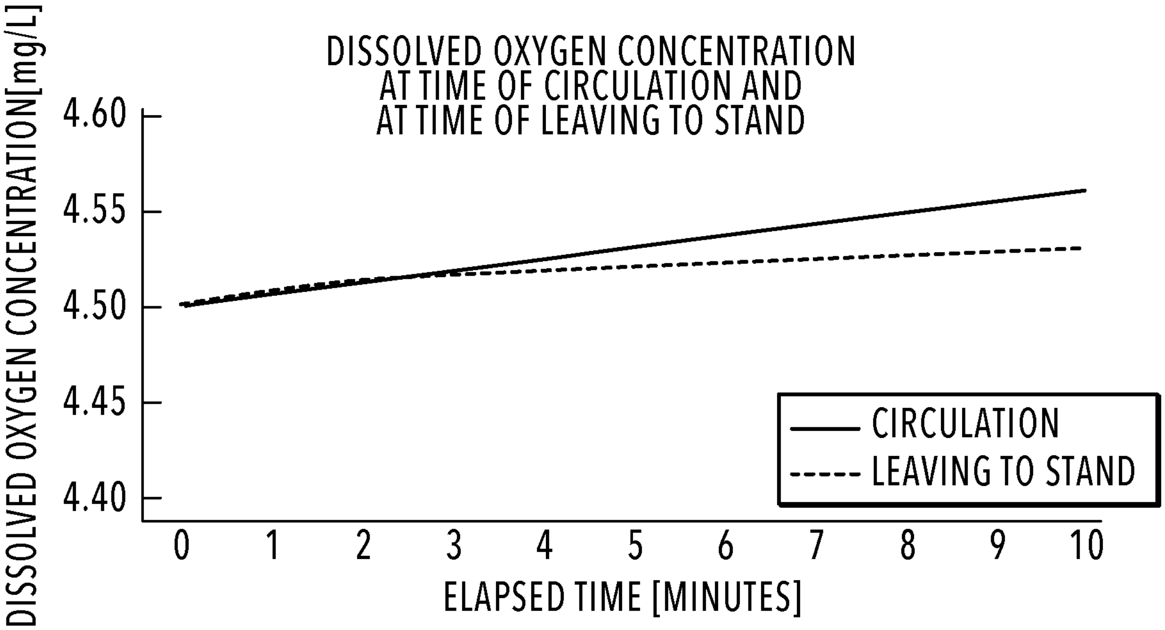

FIGS. 7A and 7B are graphs showing an aspect of an increase in dissolved oxygen concentration after deaeration. FIG. 7A indicates the dissolved oxygen concentration until 240 minutes after the deaeration. In a long time span, the degree of increase in dissolved oxygen concentration is higher in the case of performing circulation operation than in the case of leaving to stand. In other words, oxygen gets re-dissolved more rapidly in the case of performing circulation operation than in the case of leaving to stand. On the other hand, FIG. 7B is a graph enlarging a portion surrounded by a circle in FIG. 7A. In a short time span until passage of several minutes after the deaeration, it is apparent that a rate of the re-dissolution is not different between the case of performing circulation operation and the case of leaving to stand.

Now, let us assume a case of performing printing on several sheets every 2 or 3 minutes, for instance. In this case, the re-dissolution progresses at the same rate in the case of performing circulation operation and in the case of leaving to stand as shown in FIG. 7B. If the above-mentioned case is repeatedly performed, the appropriate dissolved oxygen concentration will not be available without considering the re-dissolution in the case of leaving to stand. Given the situation, this embodiment will describe an aspect of obtaining the dissolved oxygen concentration while considering the re-dissolution in the case of leaving to stand as well, thereby determining the timing to execute the deaeration. Meanwhile, ink inside the sub-tank 151 is subjected to the deaeration in this embodiment. Ink inside the circulation flow path inclusive of the print head 8 will be indirectly deaerated as a consequence of being mixed with deaerated ink. For this reason, this embodiment performs processing for obtaining the dissolved oxygen concentration while considering an amount of ink in the flow path and thus determining the timing for the deaeration. Meanwhile, since the dissolved oxygen concentration varies with the temperature, this embodiment performs the processing for obtaining the dissolved oxygen concentration while considering the environmental temperature and thus determining the timing for the deaeration.

(Outline of Dissolved Oxygen Concentration Estimation Processing)

Figure 8A:
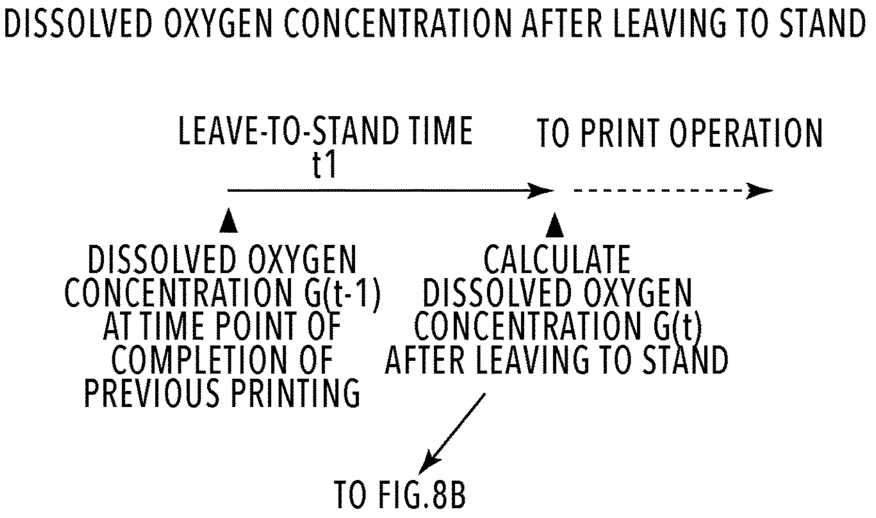
FIGS. 8A and 8B are diagrams for explaining an outline of dissolved oxygen concentration calculation processing.
Figure 8B:
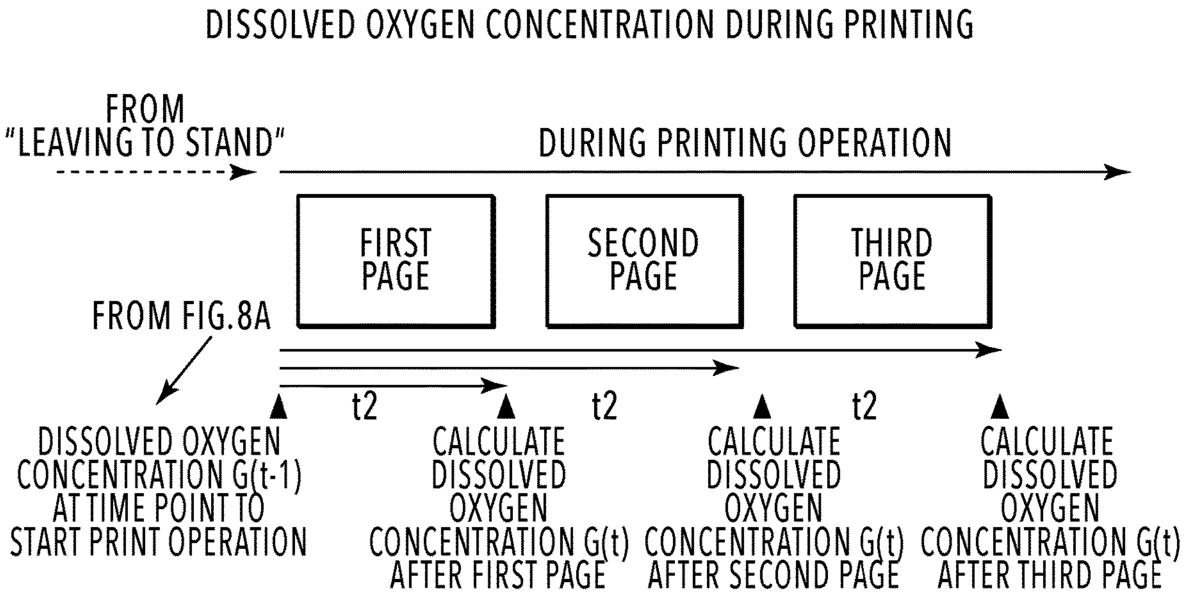

FIGS. 8A and 8B are diagrams for explaining an outline of dissolved oxygen concentration estimation processing of this embodiment. In this embodiment, the dissolved oxygen concentration estimation processing is performed in the form of calculation processing by the print controller 202. This embodiment will describe processing in the case where the print controller 202 receives a print command.

First of all, this embodiment is based on the assumption that the print controller 202 stores the dissolved oxygen concentration, which is obtained in previous calculation, in the RAM 204. Then, the concentration of oxygen dissolved in a period from the previous calculation to this predetermined processing is calculated from the previously calculated dissolved oxygen concentration, and a current dissolved oxygen concentration is calculated based on the dissolved oxygen concentration calculated in this processing and on the previously calculated dissolved oxygen concentration. The current dissolved oxygen concentration thus calculated is stored (updated) in the RAM 204 and will be used again in an upcoming occasion to obtain the dissolved oxygen concentration.

FIG. 8A illustrates a concept of the processing in the case where the print controller 202 receives the print command. No print operation is performed before the print command is received and circulation is in a stopped state. Moreover, in this embodiment, calculation of the dissolved oxygen concentration is not performed during a period from the calculation of the dissolved oxygen concentration at the time of completion of previous print operation to the reception of this print command because the degree of increase in dissolved oxygen concentration is low in a long time span as described above in the case where the circulation is stopped. Accordingly, the print controller 202 first obtains a dissolved oxygen concentration G(t−1) at a time point of completion of previous print operation from the RAM 204. Then, the print controller 202 obtains elapsed time (referred to as leave-to-stand time t1) from the time point of completion of previous print operation. For example, the print controller 202 is equipped with a not-illustrated timer and measures the elapsed time by using the timer. The print controller 202 calculates a dissolved oxygen concentration G(t) after the leaving to stand while considering re-dissolved oxygen during this leave-to-stand time t1. That is to say, prior to actual print operation, the print controller 202 calculates the current dissolved oxygen concentration (after the leaving to stand) considering oxygen that is re-dissolved during the stop of the circulation. Details of the calculation processing will be described later. Thereafter, the processing proceeds to print operation based on the print command.

FIG. 8B is a diagram explaining an outline for obtaining the dissolved oxygen concentration during printing. FIG. 8B corresponds to the processing to be executed subsequent to the processing in FIG. 8A. The print controller 202 obtains the dissolved oxygen concentration G(t−1) at a time point to start print operation from the RAM 204. The dissolved oxygen concentration G(t−1) at the time point to start print operation in FIG. 8B corresponds to the dissolved oxygen concentration G(t) after the leaving to stand in FIG. 8A. Then, the print controller 202 obtains elapsed time (referred to as print time t2) from the time point to start printing to completion of print operation on each page. Circulation operation continues during the print time t2. The print controller 202 calculates the dissolved oxygen concentration G(t) after completion of printing each page while considering oxygen re-dissolved during the print time t2. To be more precise, the print controller 202 calculates the dissolved oxygen concentration G(t) while considering the re-dissolution during the print time t2 at the time point after completion of printing each page. Then, the print controller 202 stores (updates) the calculated dissolved oxygen concentration G(t) in the RAM 204.

For example, the calculation processing using the print time t2 required from the time point to start print operation to completion of print operation on a first page is performed at the time point of completion of print operation on the first page as shown in FIG. 8B. Then, the dissolved oxygen concentration G(t) after the first page is calculated and stored (updated) in the RAM 204. If there is a second page, then print operation on the second page is subsequently performed. At a time point of completion of print operation on the second page, the calculation processing using the print time t2 required from the time point to start print operation to completion of print operation on the second page is performed. Here, the print time t2 in this case represents the time required for both the printing of the first page and the printing of the second page. The, the dissolved oxygen concentration G(t) after the second page is calculated and stored in the RAM 204. As described above, at the point of completion of print operation on each page, the dissolved oxygen concentration G(t) at that time point will be continuously updated on the RAM 204.

(Flowchart)

Figure 9:
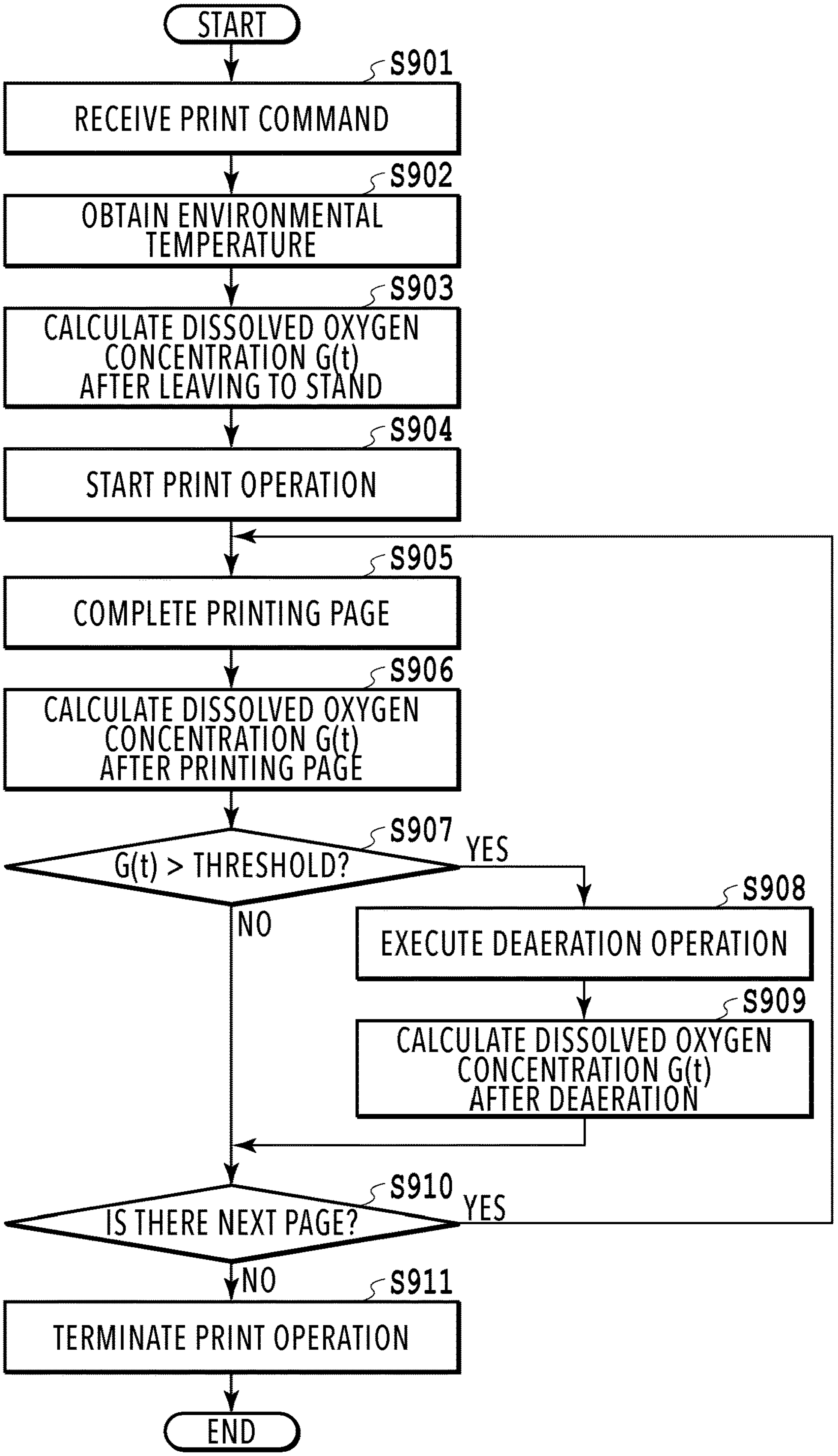
FIG. 9 is a flowchart showing an example of processing to be executed in a case where a print command is received.

FIG. 9 is a flowchart showing an example of processing to be performed in a case where the print controller 202 receives the print command in this embodiment. The processing in FIG. 9 is implemented by causing the print controller 202 to develop program codes stored in the ROM 203 and the like on the RAM 204 and to execute the program codes. Alternatively, part or all of functions in the steps in FIG. 9 may be realized by using hardware such as an ASIC and an electronic circuit. Note that the prefix code "S" appearing in the description of each processing indicates the relevant step in the flowchart.

In S901, the print controller 202 receives the print command. In S902, the print controller 202 obtains an environmental temperature of an environment where the printing apparatus 1 is installed. For example, the printing apparatus 1 may include a thermometer and obtain the environmental temperature detected with the thermometer. Alternatively, the printing apparatus 1 may obtain information on the environmental temperature from outside.

In S903, the print controller 202 calculates the dissolved oxygen concentration G(t) after the leaving to stand. The processing in S903 corresponds to the processing described in FIG. 8A. Now, details of the processing for calculating the dissolved oxygen concentration G(t) after the leaving to stand in S903 will be described below.

The print controller 202 obtains the dissolved oxygen concentration G(t−1) at the time point of completion of the previous printing, which is stored in the RAM 204. In the meantime, the print controller 202 obtains the leave-to-stand time t1. The leave-to-stand time t1 is the elapsed time from the completion of previous print operation. Meanwhile, the print controller 202 obtains a saturated dissolved oxygen concentration Gs corresponding to the environmental temperature obtained in S902. Table 1 shows the saturated dissolved oxygen concentration Gs based on the environmental temperature. Table information shown in Table 1 is assumed to be stored in the ROM 203 in advance, for example.

TABLE 1

| Saturated Dissolved Oxygen Concentration Gs Based on Environmental Temperature (mg/L) | | | | | |
|---|---|---|---|---|---|
| | Environmental Temperature | | | | |
| | ≤5° C. | ≤10° C. | ≤15° C. | ≤20° C. | 20° C.< |
| Gs | 9 | 8.4 | 7.8 | 7.1 | 6.4 |

As the re-dissolution of oxygen into deaerated ink advances, re-dissolution of oxygen progresses until reaching the saturated dissolved oxygen concentration Gs. Since the saturated dissolved oxygen concentration Gs varies with the environmental temperature as shown in Table 1, the saturated dissolved oxygen concentration Gs corresponding to the current environmental temperature is obtained.

Meanwhile, the print controller 202 obtains a re-dissolution coefficient k1 during the leaving to stand based on the environmental temperature. Table 2 shows the re-dissolution coefficient k1 during the leaving to stand based on the environmental temperature.

TABLE 2

| Re-dissolution Coefficient k1 During Leaving to Stand Based on Environmental Temperature | | | | | |
|---|---|---|---|---|---|
| | Environmental Temperature | | | | |
| | ≤5° C. | ≤10° C. | ≤15° C. | ≤20° C. | 20° C.< |
| k1 | 0.0221 | 0.0248 | 0.0274 | 0.0305 | 0.0335 |

The re-dissolution coefficient k1 during the leaving to stand is a coefficient that represents a degree of progress of re-dissolution during the leaving to stand (during the stop of circulation). The re-dissolution coefficient k1 during the leaving to stand is obtained by empirically measuring the re-dissolution on a gas-liquid interface inside the circulation path and the print head 8. Table information shown in Table 2 is assumed to be stored in the ROM 203 in advance, for example. Note that the re-dissolution coefficient k1 is proportional to the following:

$$\sqrt{\text{temperature/inkviscosity}}.$$

Therefore, the print controller 202 obtains the value corresponding to the environmental temperature. Using data obtained as described above, the print controller 202 calculates the dissolved oxygen concentration G(t) after the leaving to stand in accordance with the following Formula 1:

$$G(t)=G(t-1)+k1\times(Gs-G(t-1))\times\sqrt{t1} \quad \text{(Formula 1).}$$

Here, the first term "G(t−1)" on the right side of Formula 1 represents the dissolved oxygen concentration G(t−1) at the time point of completion of the previous printing. The remaining terms on the right side of Formula 1 indicate an increased portion of the dissolved oxygen concentration that is increased during the leave-to-stand time t1. In other words, the dissolved oxygen concentration G(t) after the leaving to stand is calculated by adding the increased portion of the dissolved oxygen concentration increased during the leave-to-stand time t1 to the dissolved oxygen concentration G(t−1) at the time point of completion of the previous printing.

Figure 10A:
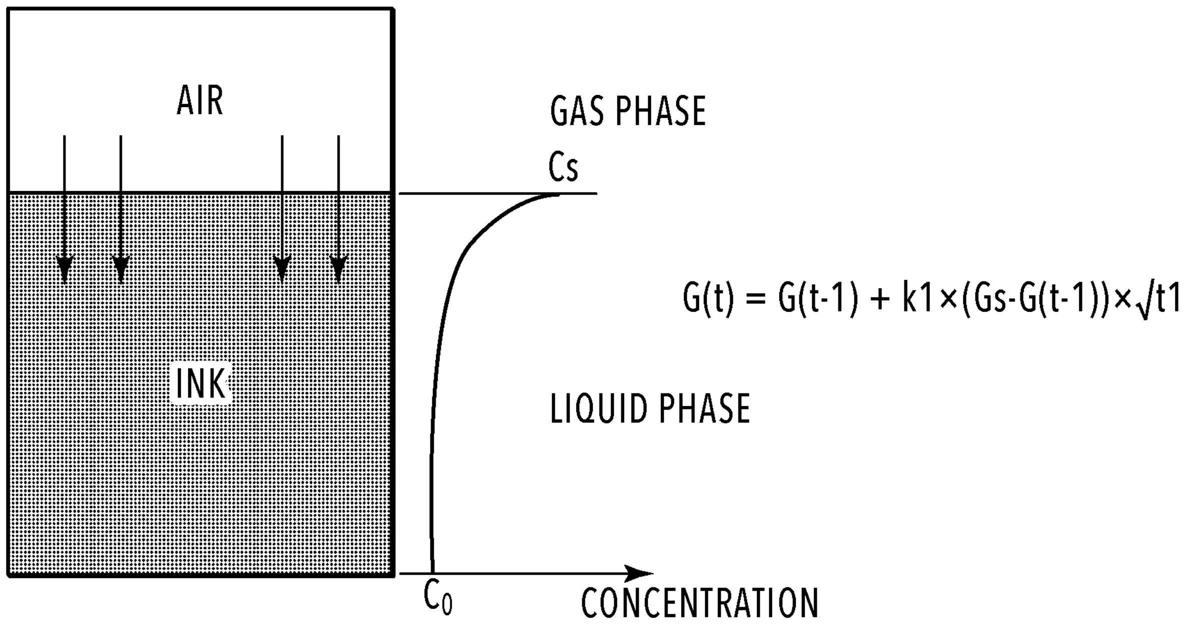
FIGS. 10A and 10B are diagrams for explaining calculation of the dissolved oxygen concentration.
Figure 10B:
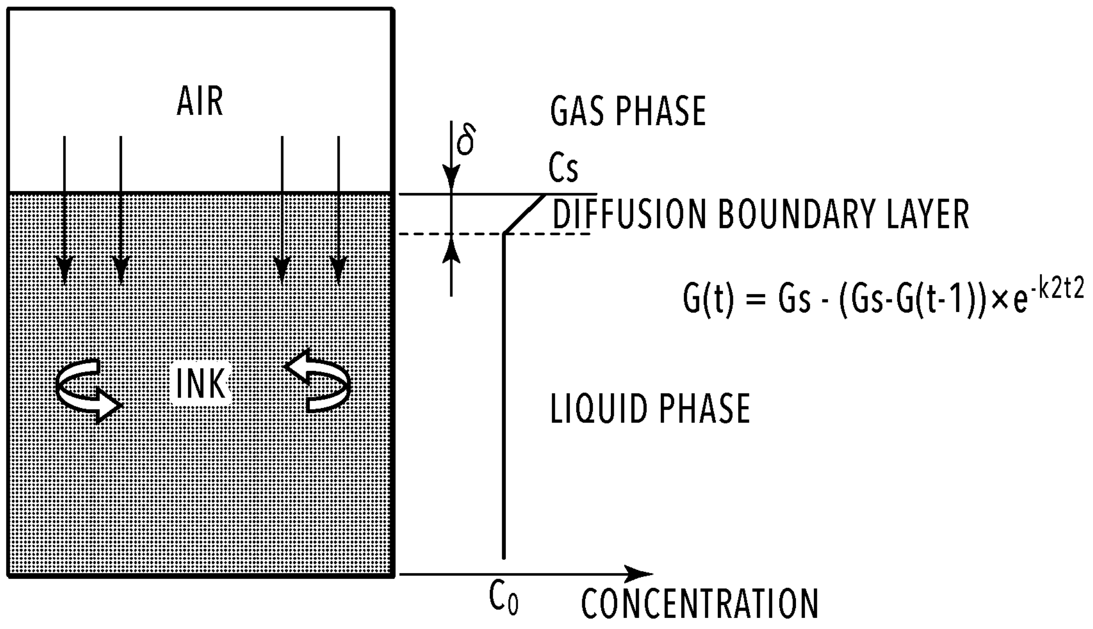

FIGS. 10A and 10B are diagrams for explaining the calculation of the dissolved oxygen concentration. FIG. 10A is a diagram corresponding to Formula 1, which explains the calculation of the dissolved oxygen concentration during the leaving to stand. Concentration distribution as shown in FIG. 10A comes into being on the gas-liquid interface during the leaving to stand. Note that C0(=G(t−1)) in FIG. 10A represents an initial dissolved oxygen concentration, which corresponds to the dissolved oxygen concentration at the time point of completion of the previous printing in this case. Meanwhile, Cs(=Gs) in FIG. 10A represents the saturated dissolved oxygen concentration. The gas (oxygen) in a gas phase is dissolved and then diffused into a liquid phase. For this reason, the concentration distribution occurs due to the diffusion from the liquid surface. An amount of oxygen dissolved per unit time is defined by the following Formula 2:

$$\frac{k1}{\sqrt{t}} \times (Cs - c0). \quad \text{(Formula 2)}$$

The dissolved oxygen concentration G(t) after the leaving to stand can be calculated in accordance with Formula 1 while considering an amount of change over time. According to Formula 1, the dissolved oxygen concentration is increased in proportion to a square root of the time, and an initial slope therefore becomes large.

In this way, the dissolved oxygen concentration G(t) after the leaving to stand in S903 is calculated. The print controller 202 updates the dissolved oxygen concentration G(t) stored in the RAM 204 with the dissolved oxygen concentration G(t) after the leaving to stand thus calculated.

In S904, the print controller 202 starts print operation. Specifically, the print controller 202 starts circulation operation, conveys a print medium, and performs printing by using the print head 8.

The processing from S905 to S910 is the processing to be repeatedly performed for each page. The printing on one page is completed in S905. In S906, the print controller 202 calculates the dissolved oxygen concentration G(t) after printing the page. The processing in S906 corresponds to the processing described in FIG. 8B. Now, details of the processing in S906 will be explained.

The print controller 202 obtains the dissolved oxygen concentration G(t−1) at the time point to start print operation from the RAM 204. The "dissolved oxygen concentration G(t−1) at the time point to start print operation" is equivalent to the dissolved oxygen concentration G(t) after the leaving to stand which is calculated in S903 and updated in the RAM 204. The print controller 202 obtains the print time t2. The print time t2 corresponds to time from the start of print operation in S904 to completion of printing the page in S905. As described in FIG. 8B, in the case where S905 is the processing involving the first page, the print time t2 is the time from the start of print operation in S904 to completion of printing the first page. In the case where S905 is the processing involving the second page, the print time t2 is the time from the start of print operation in S904 to completion of printing the second page.

Meanwhile, the print controller 202 obtains the saturated dissolved oxygen concentration Gs based on the environmental temperature obtained in S902 by referring to the table information shown in Table 1. In the meantime, the print controller 202 obtains a re-dissolution coefficient k2 during the printing based on the environmental temperature. Table 3 shows the re-dissolution coefficient k2 during the printing based on the environmental temperature.

TABLE 3

Re-dissolution Coefficient k2 During Printing Based on Environmental Temperature

| | Environmental Temperature | | | | |
|---|---|---|---|---|---|
| | ≤5° C. | ≤10° C. | ≤15° C. | ≤20° C. | 20° C.< |
| k2 | 0.079 | 0.100 | 0.122 | 0.151 | 0.181 |

The re-dissolution coefficient k2 during the printing is a coefficient that represents a degree of progress of re-dissolution during the printing (during circulation operation). The re-dissolution coefficient k2 during the printing is obtained by empirically measuring the re-dissolution on the gas-liquid interface inside the circulation path and the print head 8. Here, since the re-dissolution coefficient k2 is proportional to the temperature/ink viscosity, the print controller 202 obtains the value corresponding to the environmental temperature. Table information shown in Table 3 is assumed to be stored in the ROM 203 in advance, for example. Using data obtained as described above, the print controller 202 calculates the dissolved oxygen concentration G(t) during the printing in accordance with the following Formula 3:

$$G(t)=Gs-(Gs-G(t-1))\times e^{-k2t2} \quad \text{(Formula 3).}$$

FIG. 10B is a diagram corresponding to Formula 3, which explains the calculation of the dissolved oxygen concentration during the printing. Concentration distribution as shown in FIG. 10B comes into being during the printing, namely, on the gas-liquid interface during the circulation. Note that C0(=G(t−1)) in FIG. 10B represents the initial dissolved oxygen concentration, which corresponds to the dissolved oxygen concentration G(t−1) at the time point to start print operation in this case. Meanwhile, Cs (=Gs) in FIG. 10B represents the saturated dissolved oxygen concentration. The gas (oxygen) in the gas phase is dissolved and then diffused into the liquid phase. Unlike FIG. 10A, the concentration in the liquid phase is constant owing to the stirring (the circulation) during the circulation. Accordingly, a concentration diffusion boundary layer 6 comes into being in the vicinity of the liquid surface. In this case, the amount of oxygen dissolved per unit time is proportional to a difference in concentration between the gas phase and the liquid phase. Therefore, a transfer rate of oxygen is defined as the re-dissolution coefficient×(Cs−C0). The difference in concentration between the gas phase and the liquid phase constantly changes over time and thus needs to be calculated by using integration, which can be expressed as in Formula 3 as a result of conversion.

In this way, the dissolved oxygen concentration G(t) after printing the page is calculated in S906. The print controller 202 updates the dissolved oxygen concentration G(t) stored in the RAM 204 with the dissolved oxygen concentration G(t) after printing the page thus calculated. Note that each of the table information shown in Tables 1 to 3 may be obtained from another apparatus through a network, for example.

Subsequently, in S907, the print controller 202 determines whether or not the dissolved oxygen concentration G(t) after printing the page exceeds a threshold. The threshold used herein has a value of "5.5". The processing proceeds to S908 if the dissolved oxygen concentration G(t) exceeds the threshold. The processing proceeds to S910 if the dissolved oxygen concentration G(t) does not exceed the threshold.

In S908, the print controller 202 executes deaeration operation. At this time, print operation is suspended. Note that usability is improved by giving priority to execution of print operation as much as possible in the course of print operation, and this is why print operation is prioritized. However, in the case where the dissolved oxygen concentration G(t) exceeds the threshold, there is risk of a failure of normal ejection due to expansion of the bubble. For this reason, in this embodiment, the dissolved oxygen concentration G(t) after printing the page is calculated after the printing of each page, and deaeration operation is executed while suspending print operation if the dissolved oxygen concentration G(t) exceeds the threshold. Thereafter, the processing proceeds to S909.

In S909, the print controller 202 calculates a dissolved oxygen concentration G(t) after deaeration. In this embodiment, ink inside the sub-tank 151 is subjected to deaeration whereas ink in the rest of circulation path is not subjected to deaeration directly. Accordingly, a mixture concentration of ink deaerated inside the sub-tank 151 and non-deaerated ink in the circulation path is calculated based on ink volumes and is thus defined as the dissolved oxygen concentration G(t) after the deaeration. In a specific example, the ink volume inside the sub-tank 151 is assumed to be 80 g and the ink volume of the entire circulation path is assumed to be 200 g. In other words, the ink volume of the print head 8 and the respective flow paths except the sub-tank 151 is assumed to be 120 g. The dissolved oxygen concentration of ink inside the sub-tank 151 after the deaeration is assumed to be 3.5 mg/L. Moreover, an ink consumption amount I represents an amount of ink consumed by print operation. Under these conditions, the dissolved oxygen concentration G(t) after the deaeration can be calculated by the following Formula 4:

$$G(t)=(G(t-1)\times(200-80)+(3.5\times(80-I)))/(200-I) \quad \text{(Formula 4)}.$$

In Formula 4, the amount of oxygen in ink in the region other than the sub-tank 151 is obtained by "(G(t−1)×(200−80)" and the amount of oxygen in ink inside the sub-tank 151 is obtained by "(3.5×(80−I))". Then, the mixture concentration is calculated by dividing the amounts of oxygen by the total volume while considering the amount of ink consumption.

Figure 11:
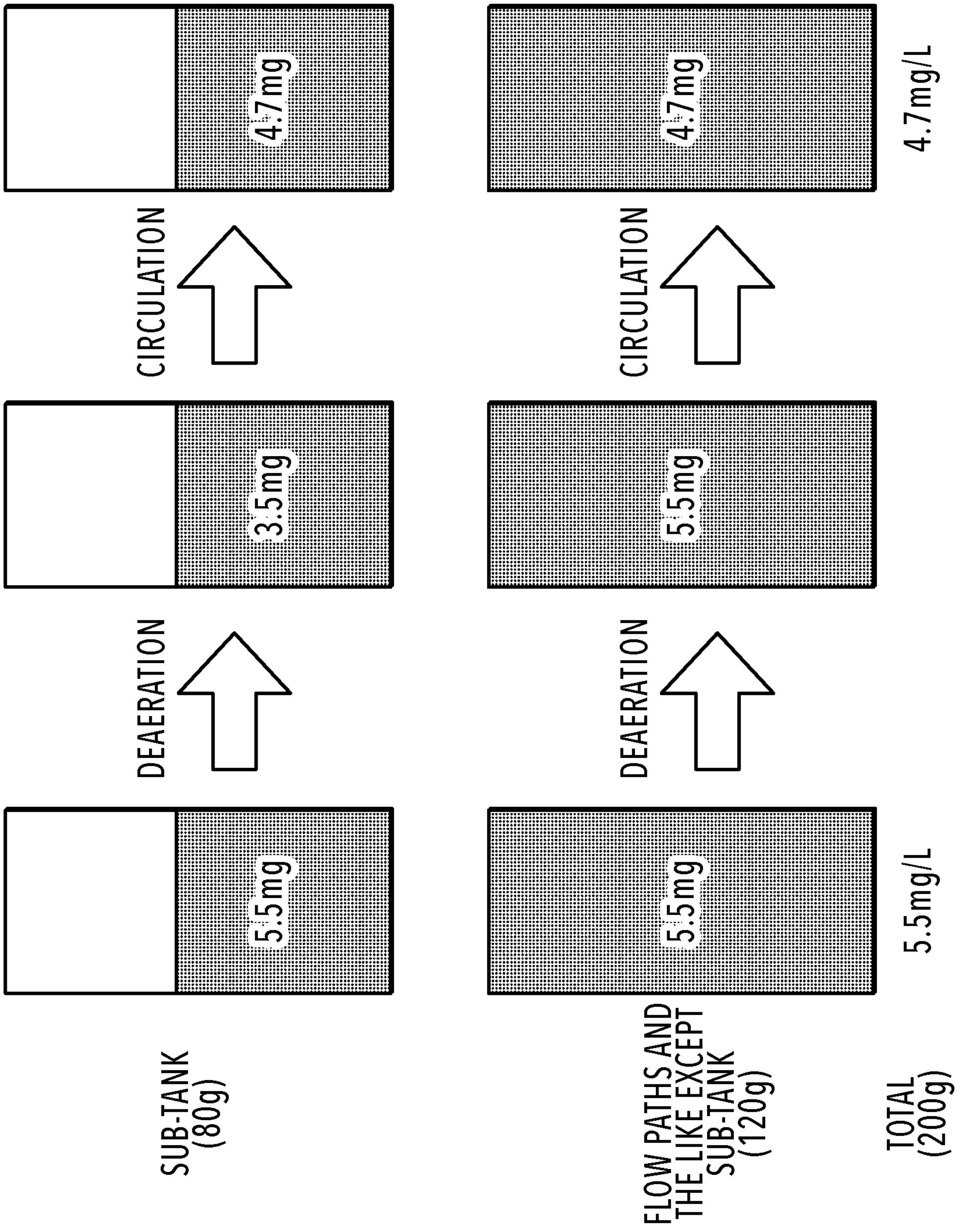
FIG. 11 is a diagram showing an outline of calculation of the dissolved oxygen concentration after deaeration.

FIG. 11 is a diagram showing an outline of calculation of the dissolved oxygen concentration G(t) after the deaeration. While the dissolved oxygen concentration in ink inside the sub-tank 151 is decreased as a consequence of deaeration operation, the dissolved oxygen concentration in the region other than the sub-tank remains unchanged. In the case where circulation takes place after the deaeration, the portions of ink inside the sub-tank 151 and in the region other than the sub-tank such as the flow paths are mixed together, whereby the dissolved oxygen concentration becomes substantially equal on the whole. The print controller 202 updates the dissolved oxygen concentration G(t) stored in the RAM 204 with the dissolved oxygen concentration G(t) after the deaeration. Then, the processing proceeds to S910.

In S910, the print controller 202 determines whether or not there is the next page. If there is the next page, the next page is printed and then the processing proceeds to S905. Thereafter, the course of the processing is repeated likewise. If there is not the next page, the processing proceeds to S911.

In S911, the print controller 202 terminates print operation. In this instance, the print controller 202 stops circulation operation. Note that this print operation will be referred to as first print operation and the next print operation to be performed following the temporary stop of circulation operation after first print operation will be referred to as second print operation. The "previous dissolved oxygen concentration G(t−1)" to be obtained in the processing of S903 in second print operation will be the dissolved oxygen concentration G(t) after the deaeration in S909 in first print operation in the case where deaeration operation is executed in first print operation. In the case where deaeration operation is not executed in first print operation, the "previous dissolved oxygen concentration G(t−1)" will be the dissolved oxygen concentration G(t) after printing the page in S906 in first print operation.

As described above, this embodiment conducts the processing while considering the dissolved oxygen concentration to be increased during circulation stop time in the case where circulation is interrupted (stopped) instead of calculating the dissolved oxygen concentration in ink based only on the ink circulation time. Thus, it is possible to calculate the dissolved oxygen concentration in ink appropriately. As a consequence, deaeration operation can be executed at appropriate timings even in the case where print operations each in a short time are repeatedly executed once in every several minutes, which makes it possible to avoid a situation of a failure of normal ejection due to generation of the bubble. Moreover, in this embodiment, the dissolved oxygen concentration is calculated by using the re-dissolution coefficient corresponding to the environmental temperature, and the dissolved oxygen concentration after the deaeration is calculated depending on the amount of ink. This makes it possible to calculate the dissolved oxygen concentration in ink more appropriately and thus to execute deaeration operation at a suitable timing.

Second Embodiment

The first embodiment has described the aspect in which the dissolved oxygen concentration increased during the stop of circulation is obtained in the case of receiving the print command and then the dissolved oxygen concentration is obtained after completion of printing each page. This embodiment will describe an aspect in which the dissolved oxygen concentration is obtained in a case other than the case of receiving the print command and the deaeration is executed in a case where the dissolved oxygen concentration exceeds a threshold.

Figure 12:
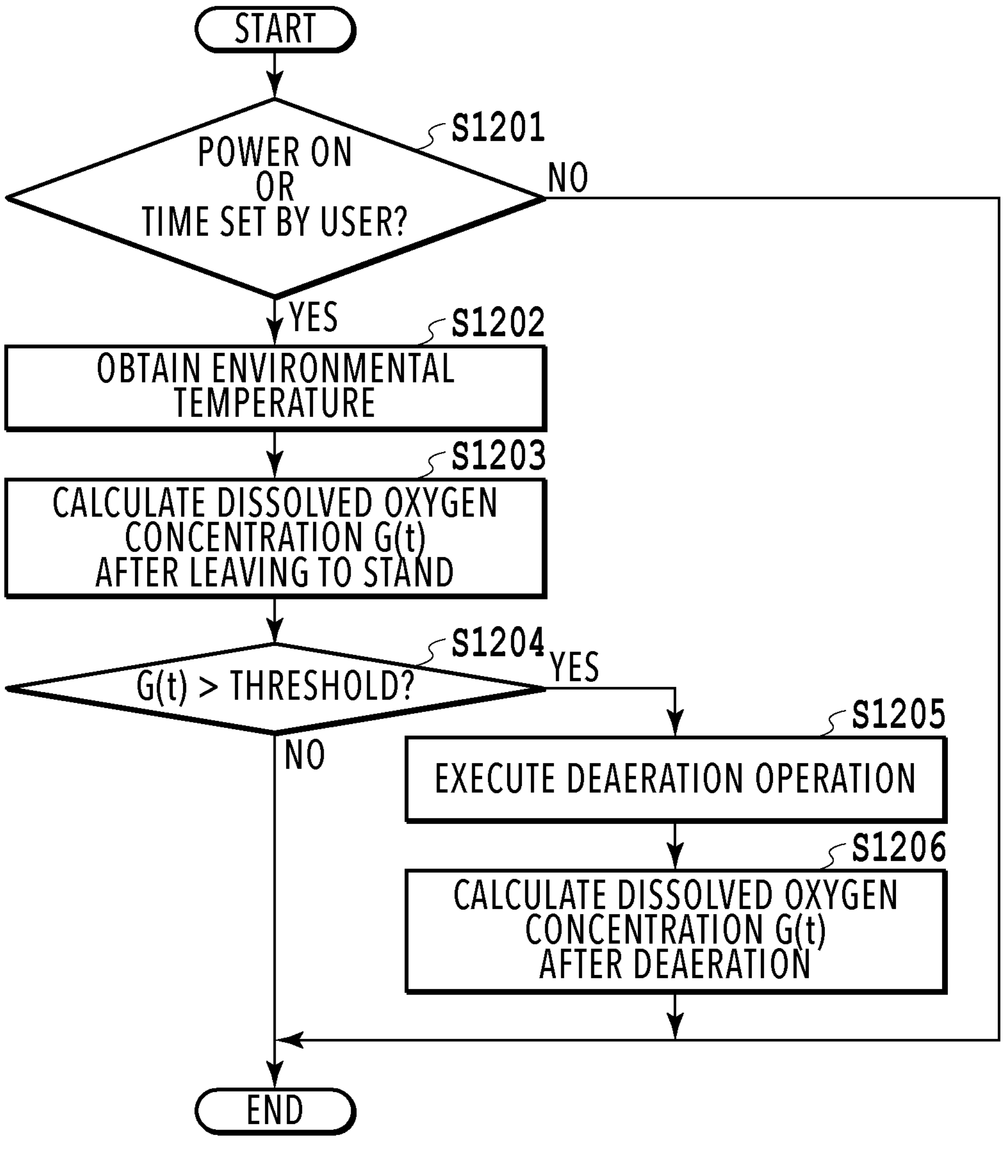
FIG. 12 is a flowchart showing an example in a case other than the case where the print command is received.

FIG. 12 is a diagram showing a flowchart of this embodiment. In S1201, the print controller 202 determines whether or not power is turned on or whether or not it is the time set by a user. The processing proceeds to S1202 if the power is turned on or if it is the time set by the user. Otherwise, the processing is terminated. For example, various maintenance operations may be executed in a lump in the case where the power is turned on or it is the time set by the user. Accordingly, in this embodiment, the processing for calculating the dissolved oxygen concentration G(t) after the leaving to stand is performed at these timings and deaeration operation is performed in the case where the dissolved oxygen concentration G(t) exceeds the threshold.

The processing in S1202 and S1203 is the same as the processing in S902 and S903 in FIG. 9. The processing in S1204 to S1206 is the same as the processing in S907 to S909 in FIG. 9. Accordingly, detailed explanation of each processing will be omitted.

As described above, even in the case other than the case of receiving the print command, it is possible to execute deaeration operation at an appropriate timing by calculating the dissolved oxygen concentration G(t) after the leaving to stand.

Third Embodiment

This embodiment discusses the processing in the case of receiving the print command as with the first embodiment. This embodiment is different from the first embodiment in that this embodiment prepares different thresholds for a case during print operation and for a case after print operation and the processing for determining the dissolved oxygen concentration G(t) based on the threshold is performed even after print operation.

Figure 13:
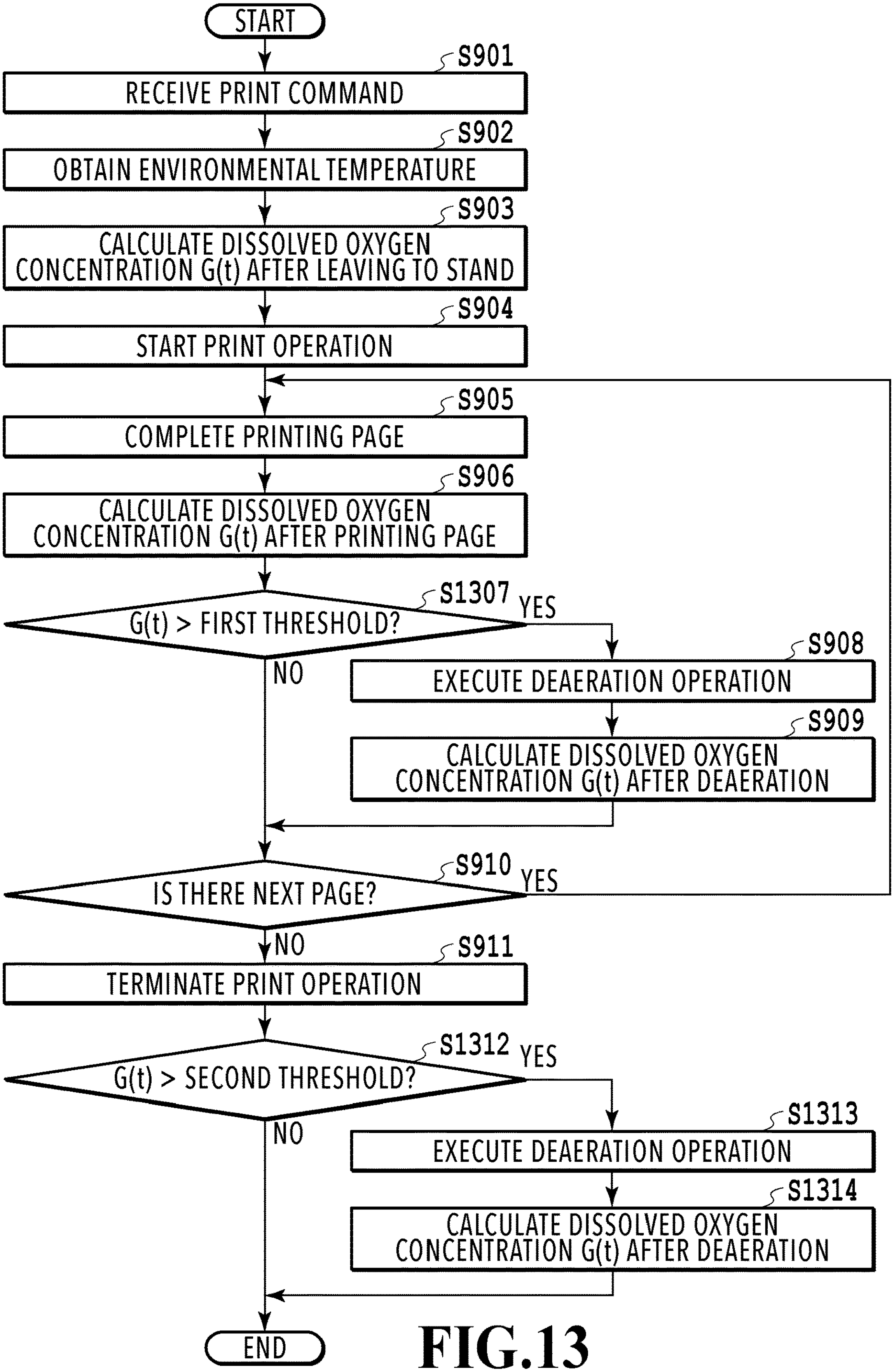
FIG. 13 is a flowchart showing an example of processing to be performed in the case where the print command is received.

FIG. 13 is a diagram showing a flowchart of this embodiment. The same steps as those in the first embodiment are denoted by the same reference numerals and the explanations thereof will be omitted.

In this embodiment, a first threshold is used in S1307 as the threshold to be compared with the dissolved oxygen concentration G(t) after printing the page. In other words, the first threshold is used as the threshold for the case during print operation. Meanwhile, a second threshold is used as the threshold to be compared with the dissolved oxygen concentration G(t) for the case after completion of print operation. The second threshold has a lower value than the first threshold. For example, the first threshold is "5.6" and the second threshold is "5.5".

After completion of print operation in S911, the print controller 202 compares the dissolved oxygen concentration G(t) stored in the RAM 204 with the second threshold in S1312. The processing proceeds to S1313 if the dissolved oxygen concentration G(t) exceeds the second threshold. The processing in S1313 and S1314 is the same as the processing in S908 and S909 that represents the processing for calculating the dissolved oxygen concentration G(t) after the deaeration following the execution of deaeration operation.

As described above, in this embodiment, the second threshold after print operation is set lower than the first threshold during print operation. Thus, the deaeration will take place slightly earlier at a timing not used by the user after print operation. Accordingly, it is possible to suppress execution of the deaeration during print operation as much as possible so as to reduce time for causing the user to stand by during the deaeration.

Fourth Embodiment

This embodiment discusses an aspect in which the deaeration is suspended in the case of receiving the print command during the execution of deaeration operation, thereby performing print operation on a priority basis.

Figure 14:
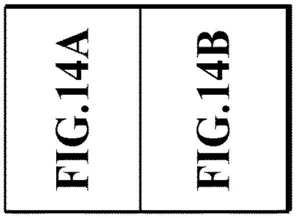
FIG. 14 is a diagram showing the relationship of FIGS. 14A and 14B.
Figure 14A:
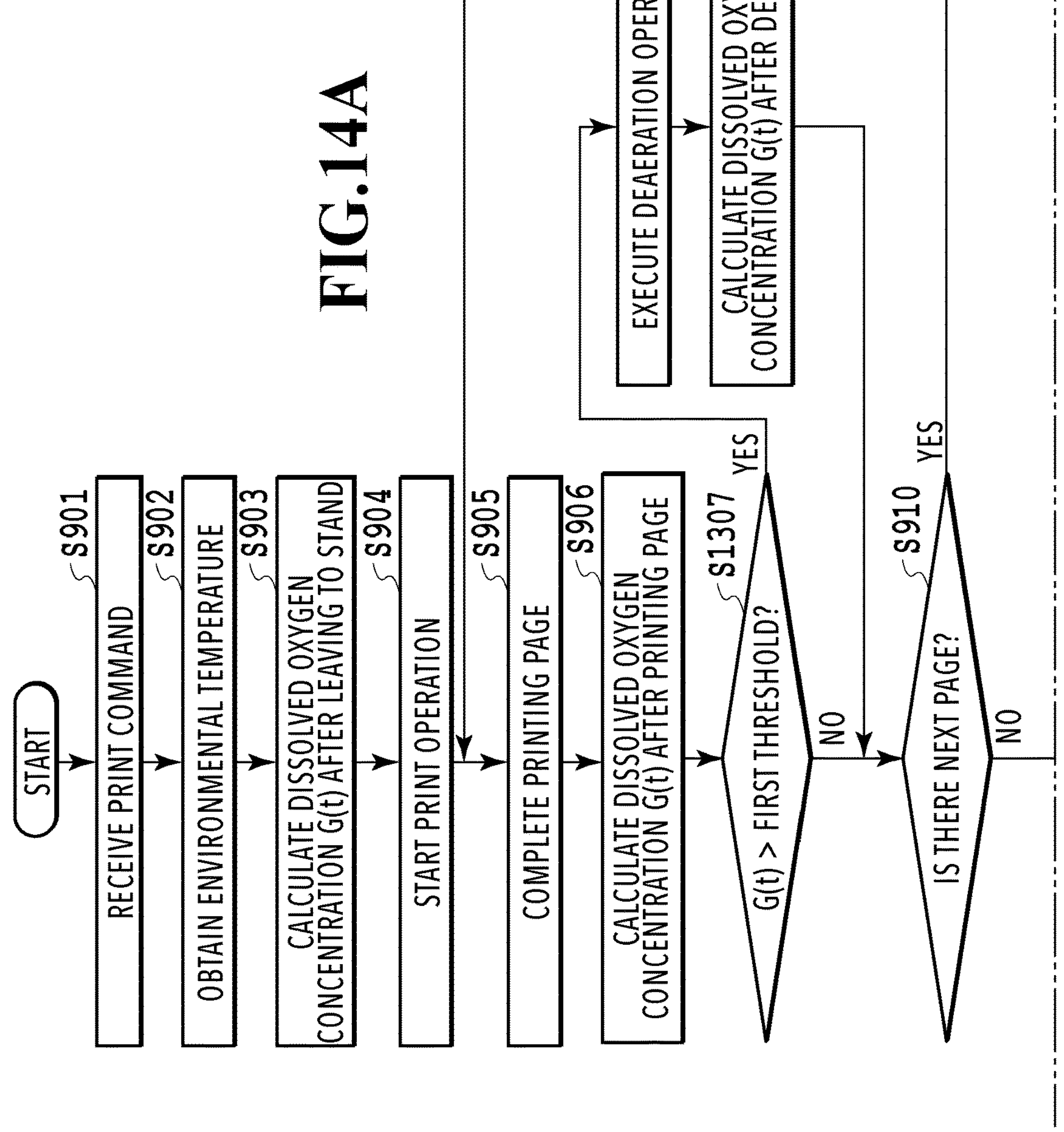
FIGS. 14A and 14B are a flowchart showing another example of the processing to be performed in the case where the print command is received.
Figure 14B:
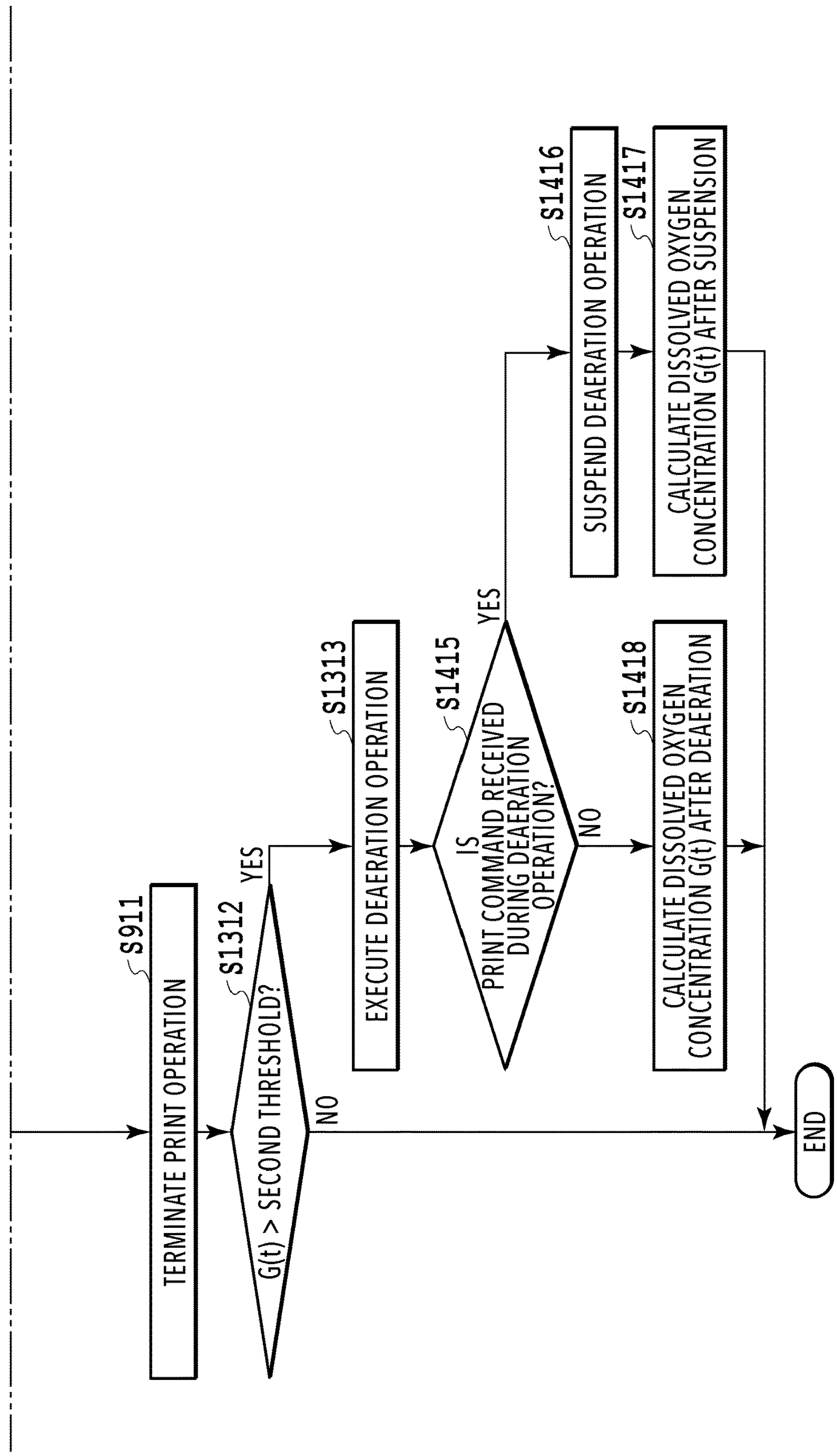

FIGS. 14A and 14B are a flowchart of this embodiment. A difference between FIGS. 14A-14B and FIG. 13 lies in processing in the case of executing deaeration operation if the dissolved oxygen concentration G(t) after print operation exceeds the second threshold in the flowchart in FIG. 13 described in conjunction with the third embodiment. Specifically, the processing in S1415 to S1418 after the execution of deaeration operation in S1313 is different from that in FIG. 13.

In S1415, the print controller 202 determines whether or not the print command is received during deaeration operation. The processing proceeds to S1416 in the case where the print command is received during deaeration operation. Otherwise, the processing proceeds to S1418. The processing in S1418 is the same processing as S1314 in FIG. 13 and the explanation thereof will be omitted.

In S1416, the print controller 202 suspends deaeration operation. Deaeration operation is performed by decompressing the inside of the sub-tank 151 and then stirring ink by using the stir bar 151*b*. Deaeration operation requires a certain period of time. Moreover, it is not possible to perform the printing during deaeration operation. For this reason, in the case where the print command is received during deaeration operation, the time for causing the user to stand by is generated as a consequence of performing control in such a way as to start print operation after completion of deaeration operation. Accordingly, in this embodiment, deaeration operation is suspended in S1416 in order to perform print operation on a priority basis.

Thereafter, in S1417, the print controller 202 calculates the dissolved oxygen concentration G(t) after the suspension of deaeration operation. In the case where deaeration operation is suspended, the dissolved oxygen concentration G(t) after the suspension varies depending on the timing of suspension. For this reason, deaeration active time t3 that represents active time before the suspension is calculated.

Figure 15:
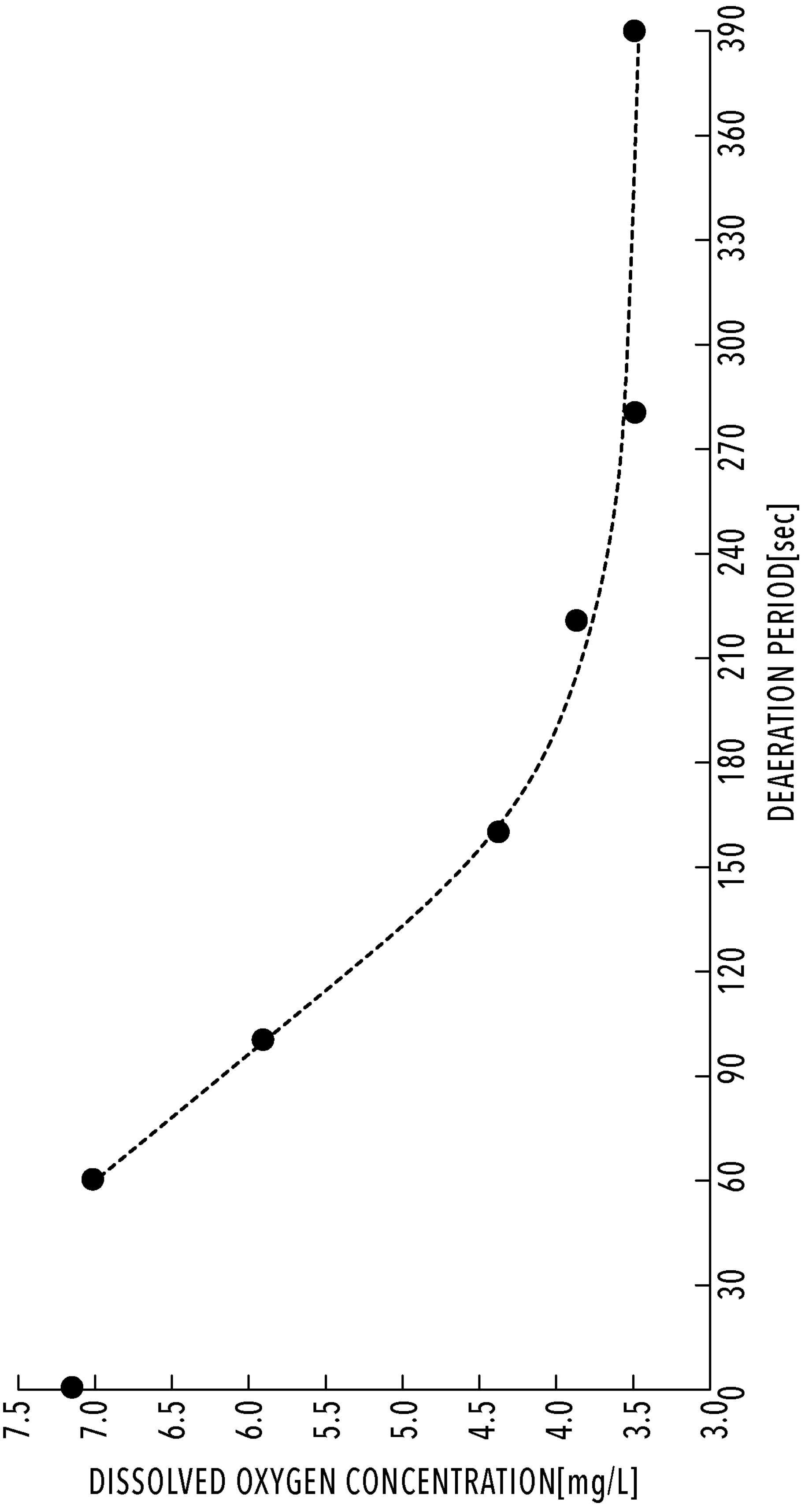
FIG. 15 is a graph showing an example of a transition of the dissolved oxygen concentration during deaeration inside a sub-tank.

FIG. 15 is a graph showing an example of a transition of the dissolved oxygen concentration G(t) during the deaeration inside the sub-tank 151. In this embodiment, in the case of starting deaeration operation, the decompression inside the sub-tank 151 is started by using the vacuum pump P0 in the first place. In this embodiment, the decompression is first conducted for 60 seconds in order to set the pressure inside the sub-tank 151 to a given negative pressure. Thereafter, the stirring of ink is started by using the stir bar 151*b*. As shown in FIG. 15, the dissolved oxygen concentration does not change in the state where the stir bar 151*b* is not driven. Accordingly, the deaeration active time t3 is obtained by subtracting 60 seconds. Specifically, the deaeration active time t3 is obtained in accordance with the following Formula 5:

$$t3=\text{time to suspend deaeration}-\text{time to start deaeration operation}-60\text{ seconds} \quad \text{(Formula 5).}$$

Moreover, the print controller 202 calculates the dissolved oxygen concentration G(t) after the suspension by using the deaeration active time t3 and in accordance with the following Formula 6:

$$G(t)=(G(t-1)\times(200-80)+((G(t-1)-(G(t-1)-3.5)/330\times t3)\times(80-I)))/(200-I) \quad \text{(Formula 6).}$$

The first term "(G(t−1)×(200−80)" on the right side represents an amount of dissolved oxygen in ink in the flow paths and the like except the sub-tank 151. The second term "(G(t−1)−(G(t−1)−3.5)/330×t3)×(80−I)" on the right side represents an amount of dissolved oxygen in ink inside the sub-tank 151 after the suspension of the deaeration. In the second term on the right side, the concentration reduced before the suspension is subtracted from the previous dissolved oxygen concentration G(t−1) stored in the RAM 204, that is, the original concentration. Here, as shown in FIG. 15, the stir bar 151*b* starts driving 60 seconds later. As shown in FIG. 15, a period of decline of the dissolved oxygen concentration is a period from 60 seconds later to 390 seconds later from the time to start the deaeration, or in other words, a period of 330 seconds. Accordingly, in the second item on the right side, a difference between the previous dissolved oxygen concentration G(t−1) (that is, the original concentration) stored in the RAM 204 and the concentration (3.5) after the deaeration is divided by 330 seconds and is then multiplied by the deaeration active time t3, and the dissolved oxygen concentration inside the sub-tank 151 after the suspension is thus obtained. The print controller 202 updates the dissolved oxygen concentration G(t) stored in the RAM 204 with the dissolved oxygen concentration G(t) after the suspension thus calculated. Note that the processing returns to S901 after the processing in S1417, and the above-described processing will be subsequently performed.

This embodiment has explained the example of suspending deaeration operation in the case where the print command is received in the course of execution of deaeration operation after print operation. On the other hand, this suspension operation is not performed in the case where deaeration operation is being executed in the course of print operation, because such deaeration operation is executed in the course of print operation due to high likelihood of generation of a bubble. Accordingly, this embodiment is designed not to suspend deaeration operation in the course of print operation so as to give priority to achieving stable ejection.

As described above, it is preferable to suspend deaeration operation explained in this embodiment in the case where the print command is received during the execution of deaeration operation while print operation is not performed. Accordingly, if deaeration operation is executed in the case other than reception of the print command as described in conjunction with the second embodiment, the deaeration may be suspended and the processing for calculating the dissolved oxygen concentration after the suspension may be performed as discussed in this embodiment.

As described above, according to this embodiment, in the case where the print command is received during the execution of deaeration operation while not performing print operation, the deaeration is suspended and the processing for calculating the dissolved oxygen concentration after the suspension is performed. This processing makes it possible to suppress generation of the time for causing the user to stand by since print operation is started without having to wait for completion of deaeration operation. Moreover, the dissolved oxygen concentration after the suspension is calculated even in the case where the deaeration is suspended. Accordingly, it is possible to calculate the dissolved oxygen concentration appropriately in the subsequent processing as well.

Fifth Embodiment

This embodiment discusses an aspect of contracting the bubble in the flow path (inside the flow path of the print head 8 in particular) by performing circulation instead of performing the temperature control of the print head 8 after the execution of deaeration operation described in each of the aforementioned embodiments.

Figure 16:
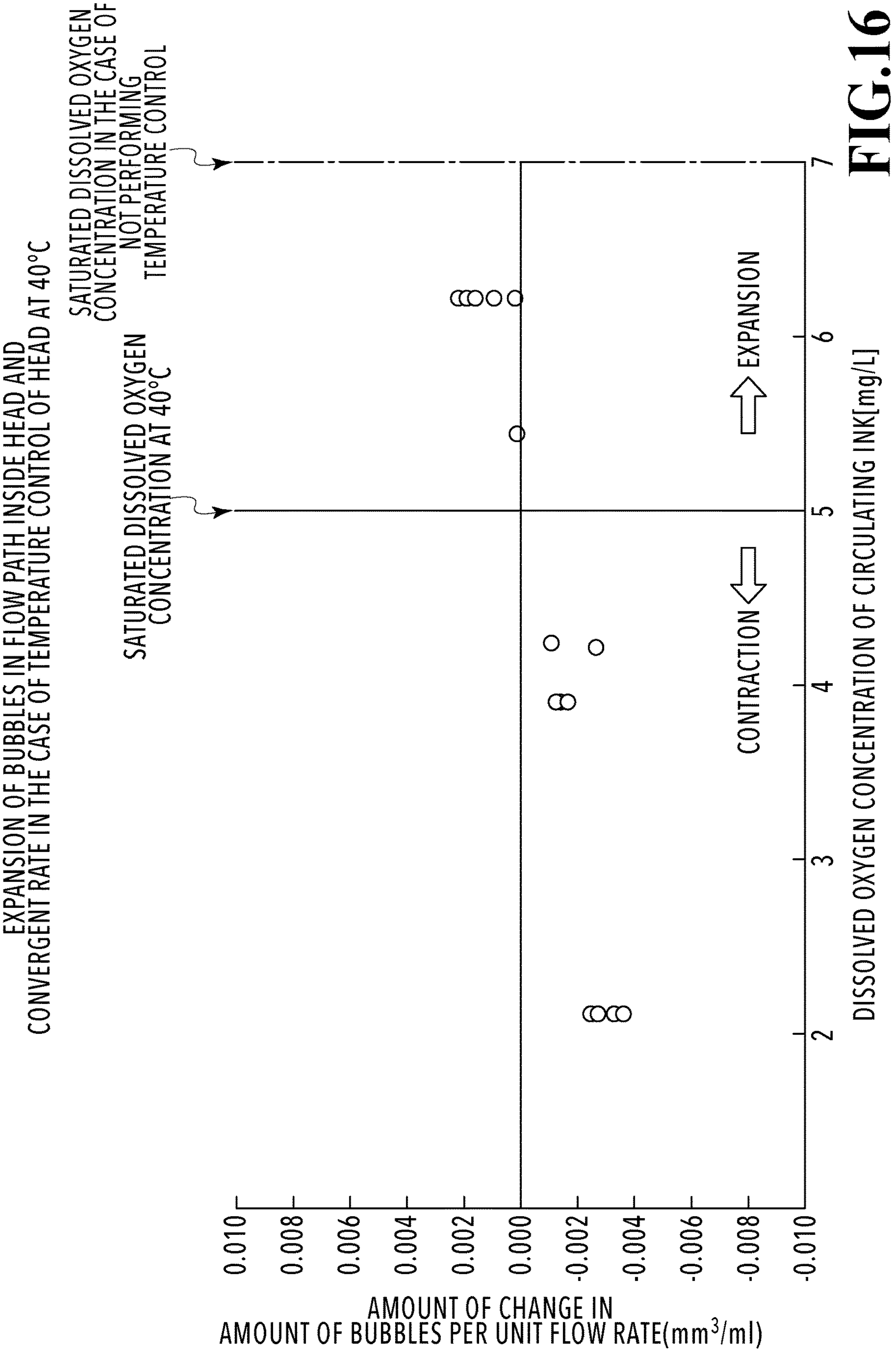
FIG. 16 is a graph showing a result of observation of a change in amount of bubbles inside a flow path of a print head.

FIG. 16 is a graph showing a result of observation of a change in amount of bubbles inside the flow path of the print head 8 while changing the dissolved oxygen concentration of circulating ink in the state where the print head 8 is subjected to temperature control at 40° C. FIG. 16 shows a result of observation of the change in amount of bubbles while performing the circulation in the state of mixing bubbles into ink at a predetermined dissolved oxygen concentration. The horizontal axis of FIG. 16 indicates the dissolved oxygen concentration of circulating ink and the vertical axis thereof indicates an amount of change in amount of bubbles per unit flow rate. A case of a positive amount of change in amount of bubbles indicates expansion of the bubbles while a case of a negative amount of change in amount of bubbles indicates contraction of the bubbles.

As shown in FIG. 16, an effect of contraction of the bubbles in the flow path inside the print head 8 occurs in the case where the dissolved oxygen concentration of circulating ink is lower than the saturated dissolved oxygen concentration (5 mg/L) at the temperature of the flow path inside print head 8, namely, at 40° C. Moreover, the effect of contraction is increased more as the difference between the saturated dissolved oxygen concentration at 40° C. and the dissolved oxygen concentration of circulating ink is larger. On the other hand, the bubbles in the flow path inside the head are expanded in the case where the dissolved oxygen concentration of circulating ink is higher than the saturated dissolved oxygen concentration at 40° C.

Here, the saturated dissolved oxygen concentration becomes generally higher at the environmental temperature where the printing apparatus 1 is installed as compared to the temperature at 40° C. in the flow path inside the print head 8 subjected to the temperature control. In other words, the saturated dissolved oxygen concentration becomes higher in the case where ink is put into circulation at the temperature near the environmental temperature without subjecting the print head 8 to the temperature control. As a consequence, a threshold line indicating whether the bubbles are contracted or expanded becomes higher (by shifting rightward) as shown in FIG. 16. Furthermore, the dissolved oxygen concentration of ink after the deaeration becomes a lower value closer to the left side in FIG. 16. In other words, in the case where ink is put into circulation without performing the temperature control of the print head after the deaeration, the difference between the saturated dissolved oxygen concentration corresponding to the temperature (the environmental temperature) in the flow path inside the print head 8 and the dissolved oxygen concentration of circulating ink becomes larger than that in the case of performing the temperature control. Accordingly, the effect of contracting the bubbles in the flow path inside the print head 8 is further enhanced.

For this reason, in this embodiment, the bubbles in the flow path inside the print head 8 or in other circulation flow paths are contracted by putting ink with the reduced dissolved oxygen concentration after deaeration operation into circulation in the state of not performing the temperature control of the print head 8 after performing deaeration operation.

Figure 17:
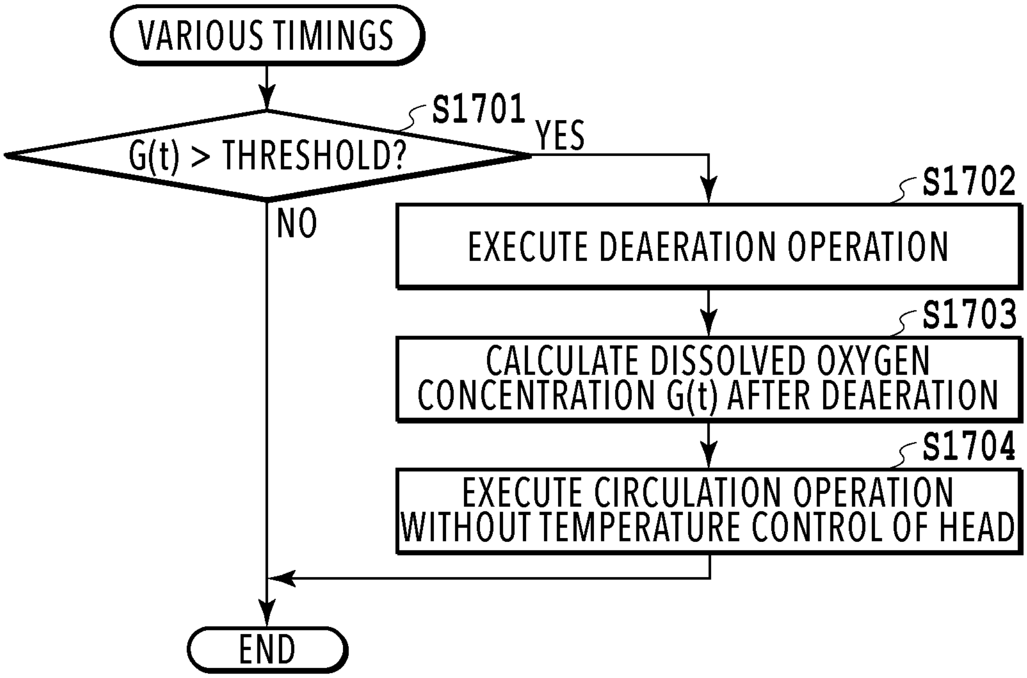
FIG. 17 is a flowchart showing an excerpt of part of processing at various timings.

FIG. 17 is a diagram showing a flowchart concerning characterizing portions of this embodiment. FIG. 17 is a flowchart in which portions related to the determination processing of the calculated dissolved oxygen concentration G(t) and the threshold as described in the first to fourth embodiments are excerpted for the purpose of explanation. As shown in S1701, as a consequence of the determination of the calculated dissolved oxygen concentration G(t) and the threshold, the processing proceeds to S1702 if the dissolved oxygen concentration G(t) exceeds the threshold. Deaeration operation is executed in S1702. The dissolved oxygen concentration G(t) after the deaeration is calculated in S1703. The series of the processing mentioned above is the same as the processing described in conjunction with each of the first to fourth embodiments. In S1704, the print controller 202 executes circulation operation without performing the temperature control of the print head 8. Then, the processing is terminated.

As described above, according to this embodiment, it is possible to enhance the effect of contracting the bubbles in the flow path inside the print head 8 by executing circulation operation without performing the temperature control of the print head 8 after execution of deaeration operation at a predetermined timing.

Sixth Embodiment

This embodiment is related to an aspect of performing circulation operation without performing the temperature control of the print head 8 after deaeration operation in order to achieve contraction of the bubbles in the flow path inside the print head 8 as described in the fifth embodiment. In the following, this circulation will be referred to as "bubble removal circulation". This embodiment discusses the aspect in which, in the case where deaeration operation is executed in the course of print operation, the bubble removal circulation is executed after completion of print operation instead of executing the bubble removal circulation immediately after completion of deaeration operation. If the bubble removal circulation is performed immediately after completion of deaeration operation being executed in the course of print operation, the time for causing the user to stand by is increased because print operation will not advance to completion until the bubble removal circulation is completed. Accordingly, the bubble removal circulation is performed in this embodiment in the state where print operation is completed.

Figures 18, 18A:
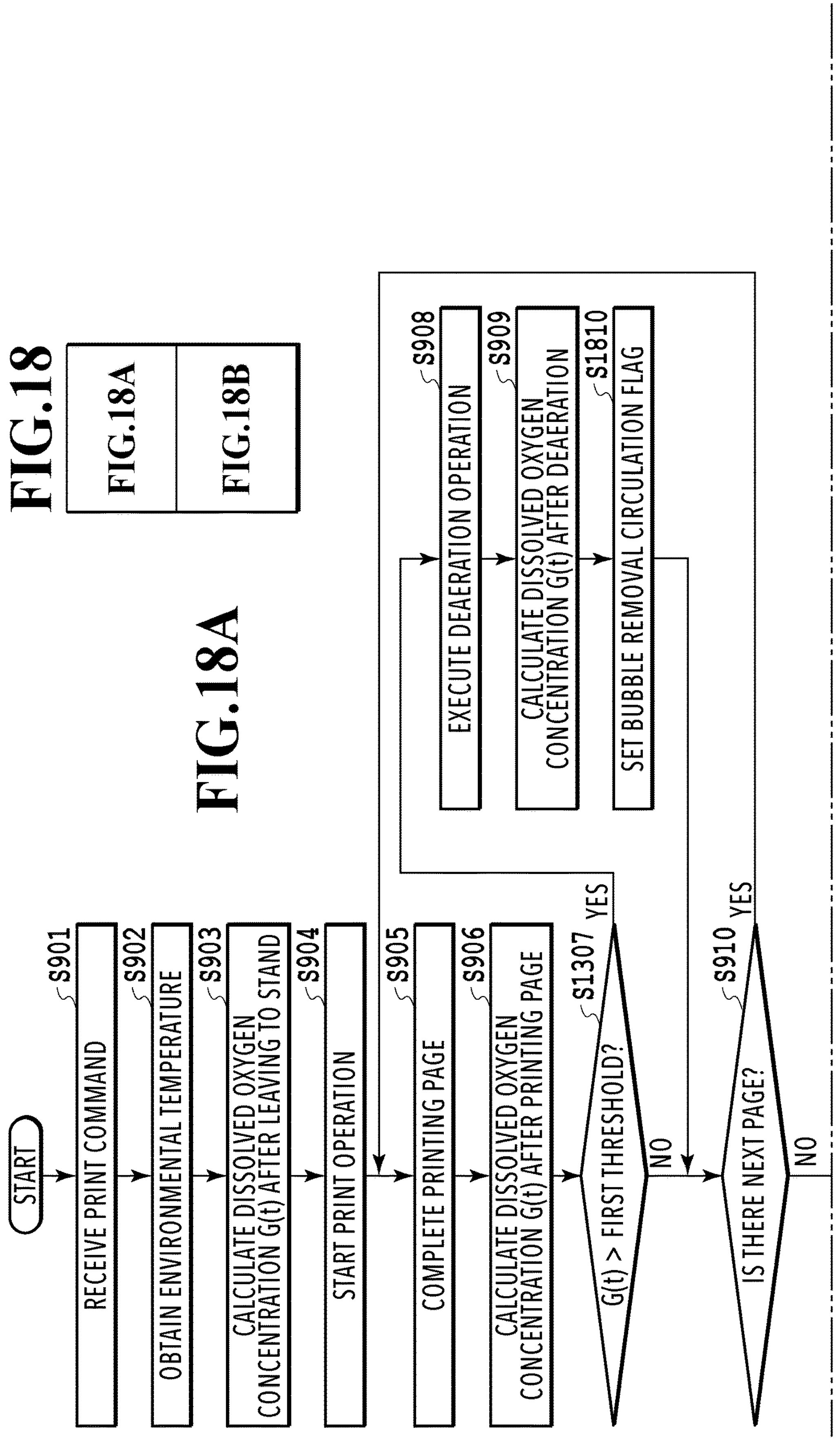
FIG. 18 is a diagram showing the relationship of FIGS. 18A and 18B.
FIGS. 18A and 18B are a flowchart showing another example of the processing to be executed in the case where the print command is received.
Figure 18B:
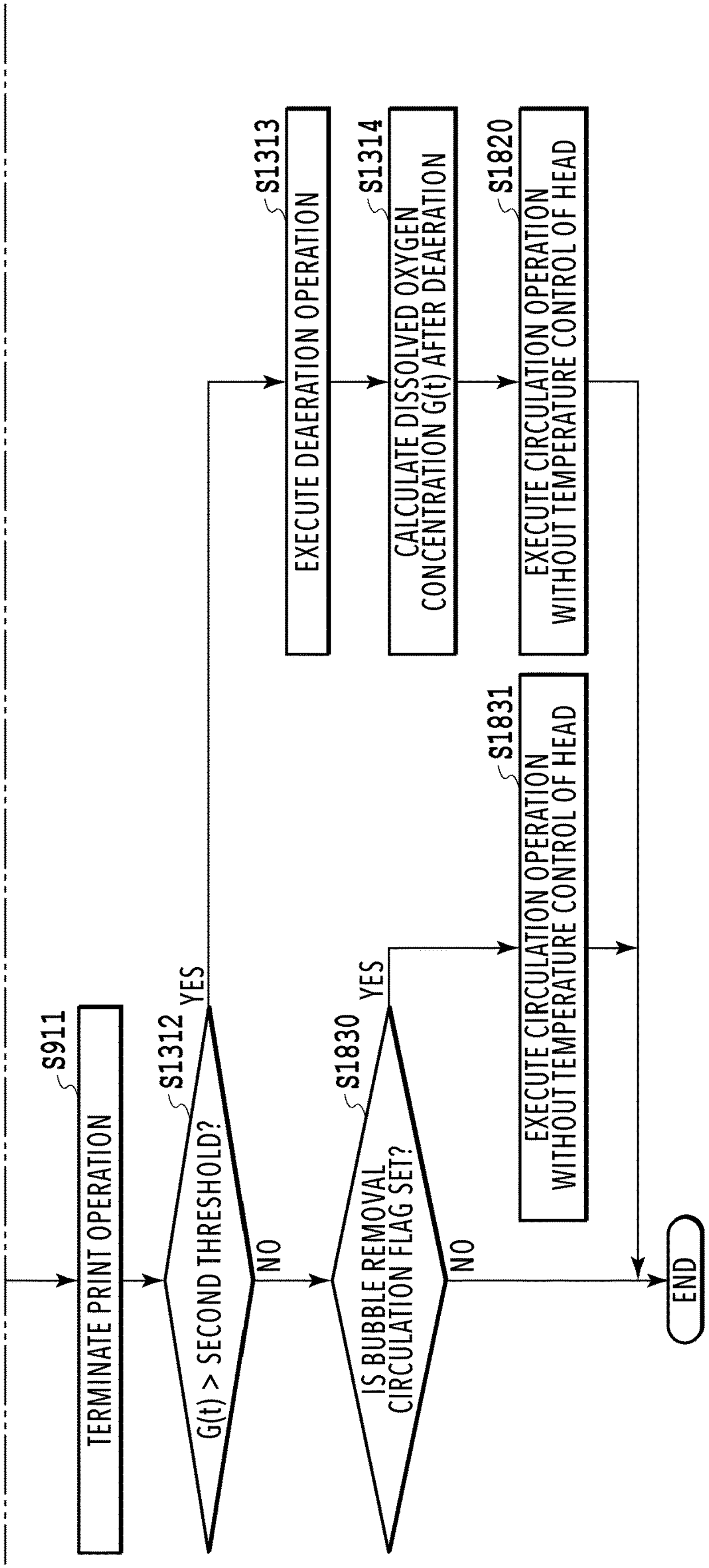

FIGS. 18A and 18B are a flowchart of this embodiment. Here, the same steps as the steps described in the third embodiment with reference to FIG. 13 will be denoted by the same reference numerals and the explanations thereof will be omitted. In the case where deaeration operation is executed in S908 in the course of print operation, the print controller 202 sets a bubble removal circulation flag in S1810 subsequent to the processing in S909. The bubble removal circulation flag is a flag which indicates that the bubble removal circulation is necessary. The processing goes on thereafter. In S1312, if the dissolved oxygen concentration G(t) after print operation does not exceed the second threshold in S1312, the processing proceeds to S1830.

In S1830, the print controller 202 determines whether or not the bubble removal circulation flag is set. The processing proceeds to S1831 if the bubble removal circulation flag is set. Otherwise, the processing is terminated. In S1831, the print controller 202 executes circulation operation (the bubble removal circulation) without performing the temperature control of the print head. Then, the print controller 202 resets the bubble removal circulation flag. Here, if the dissolved oxygen concentration G(t) after print operation exceeds the second threshold in S1312, the processing proceeds to the S1820 through the processing in S1313 and S1314. In S1820, the print controller 202 executes circulation operation (the bubble removal circulation) without performing the temperature control of the print head.

As described above, this embodiment is designed to memorize the necessity of the bubble removal circulation in the case where deaeration operation is performed in the course of print operation, and to execute the bubble removal circulation after completion of print operation instead of executing the bubble removal circulation immediately after deaeration operation. Accordingly, as a consequence of postponing execution of the bubble removal circulation to a point after completion of print operation, this embodiment can reduce the time for causing the user to stand by due to the bubble removal circulation.

While this embodiment has been described based on the third embodiment, this embodiment may be combined with any other embodiments. For example, this embodiment may be combined with the fourth embodiment.

Seventh Embodiment

This embodiment discusses an aspect in which, in the case where the print command is received during bubble removal circulation operation, print operation is performed on a priority basis while suspending bubble removal circulation operation. Moreover, information (referred to as a suspension history) indicating suspension of bubble removal circulation operation is stored and a threshold used for determination as to whether or not it is appropriate to execute deaeration operation is changed depending on the suspension history. To be more precise, in the case where the suspension history is present, the bubble removal circulation has not been sufficiently performed yet. Accordingly, the threshold used for determination to execute upcoming deaeration operation is reduced so as to execute the bubble removal circulation earlier by moving up the timing for the deaeration.

Figure 19:
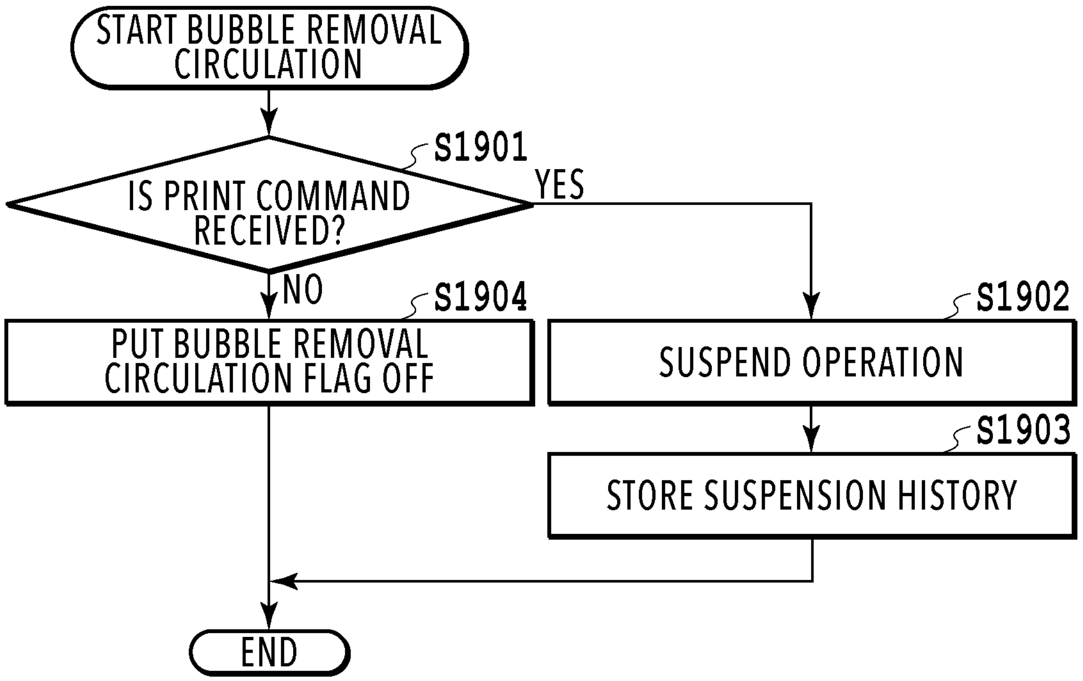
FIG. 19 is a flowchart concerning processing during bubble removal circulation operation.

FIG. 19 is a flowchart concerning processing during bubble removal circulation operation. During bubble removal circulation operation, the print controller 202 performs determination in S1901 as to whether or not the print command is received. The processing proceeds to S1902 in the case where the print command is received. In S1902, the print controller 202 suspends bubble removal circulation operation. In S1903, the print controller 202 stores the suspension history in the RAM 204, and then terminates the processing in FIG. 19. Thereafter, the processing proceeds to S2001 in FIG. 20A to be described later. On the other hand, if the print command is not received, the processing proceeds to S1904 where the bubble removal circulation flag is put off since the bubble removal circulation is completed. Then, the processing in FIG. 19 is terminated.

Figure 20A:
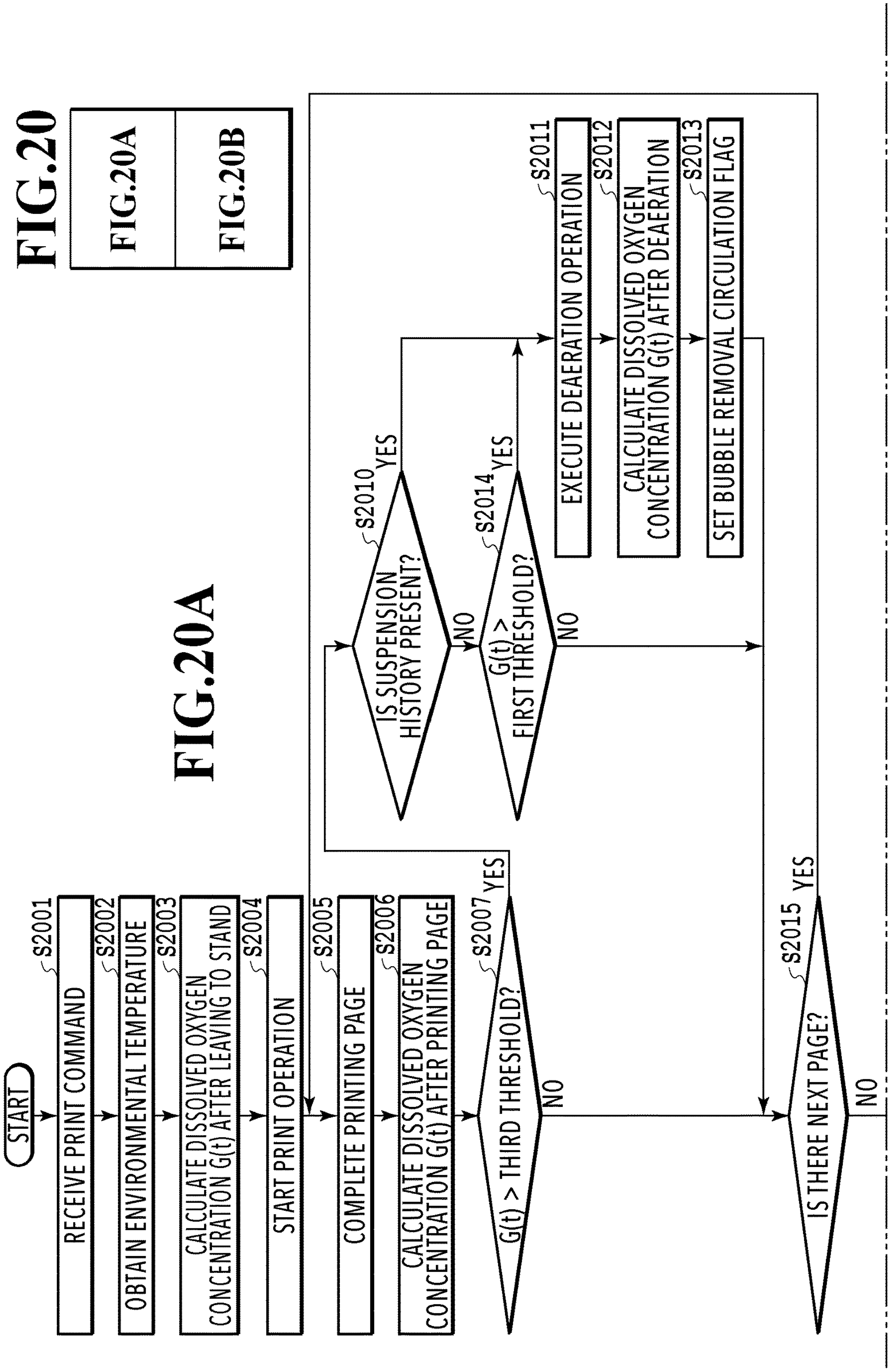
FIGS. 20A and 20B are a flowchart showing another example of the processing to be executed in the case where the print command is received.
Figure 20B:
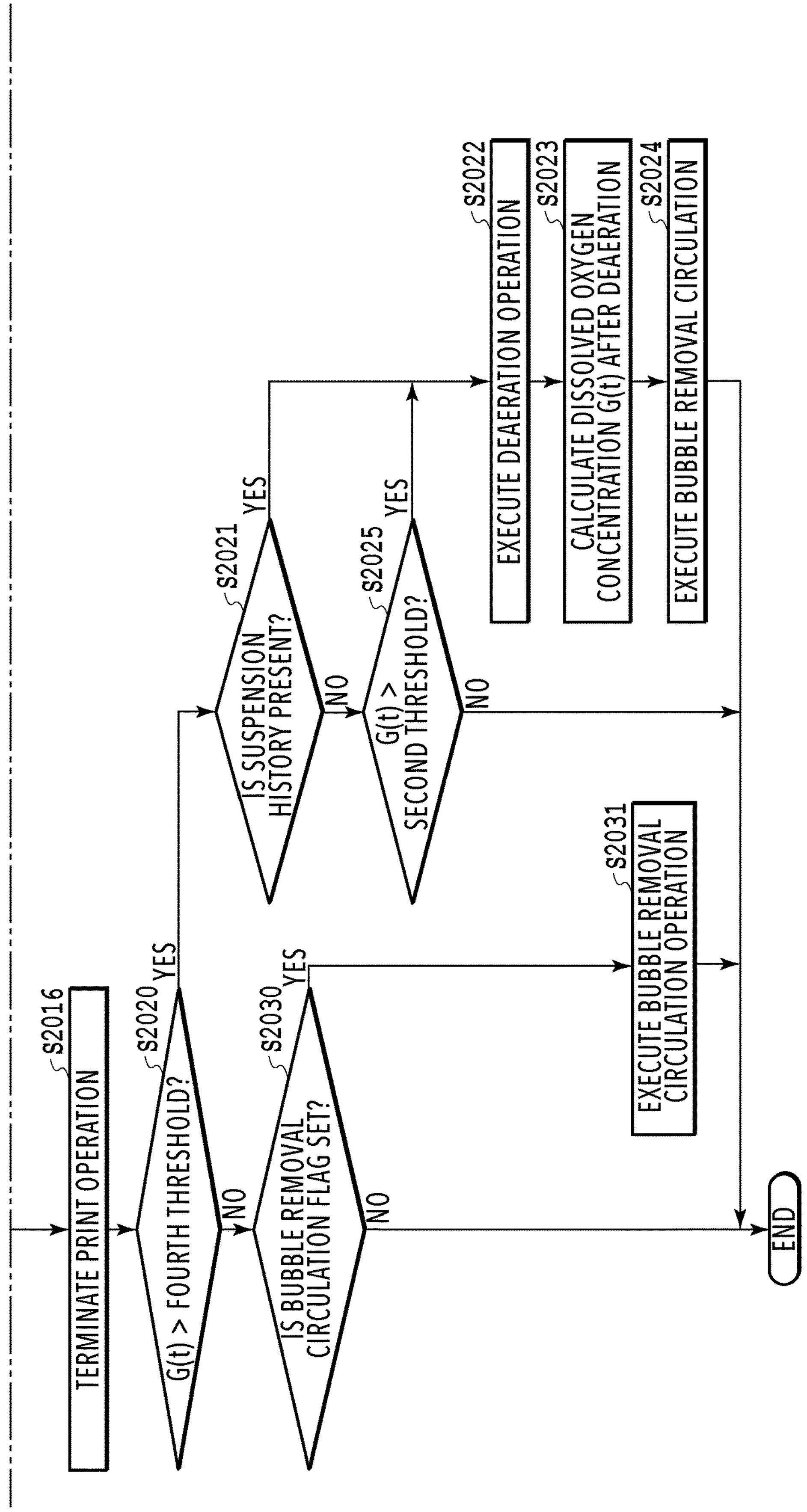

FIGS. 20A and 20B are a flowchart showing another example of the processing to be performed in the case where the print command is received in this embodiment. Four thresholds are used in this embodiment. The following is an example of the thresholds in which magnitude relations among the thresholds satisfy relations defined as a first threshold>a second threshold>a third threshold>a fourth threshold:

the first threshold: 5.6;
the second threshold: 5.5;
the third threshold: 5.1; and
the fourth threshold: 5.0.

The processing from S2001 to S2006 is the same as the processing from S901 to S906 in FIG. 9. In S2007, the print controller 202 compares the dissolved oxygen concentration G(t) with the third threshold. The processing proceeds to S2010 if the dissolved oxygen concentration G(t) exceeds the third threshold. Otherwise, the processing proceeds to S2015. The third threshold has a lower value than the first threshold used for determination in the case where the suspension history is not present, which will be described later.

In S2010, the print controller 202 determines whether or not the suspension history is present. The processing proceeds to S2011 in the case where the suspension history is present. Otherwise, the processing proceeds to S2014. The processing from S2011 to 52013 is the same as the processing in S908, S909, and S1810 in FIG. 18A. To put it briefly, the series of the processing to be taken up by S2007, S2010, S2011, and so forth corresponds to processing for moving up the timing for the deaeration and moving up the timing for bubble removal circulation operation in the case where the suspension history is present. Specifically, according to this embodiment, in the case where the suspension history is present, the determination processing is performed by using the threshold (the third threshold) lower than the threshold (the first threshold) applicable to the determination in the case where the suspension history is not present. In this way, the processing for moving up the timing for the deaeration and moving up the timing for bubble removal circulation operation is performed in the case where the suspension history is present.

In the case where the suspension history is not present, the print controller 202 performs processing for comparing the dissolved oxygen concentration G(t) with the first threshold in S2014. The processing proceeds to S2011 in the case where the dissolved oxygen concentration G(t) exceeds the first threshold. Otherwise, the processing proceeds to S2015. The processing in S2015 is the same as the processing in S910. Meanwhile, the processing for terminating print operation in S2016 subsequent to S2015 is the same as the processing in S911.

In S2020 subsequent to the processing for terminating print operation in S2016, the print controller 202 determines whether or not the dissolved oxygen concentration G(t) exceeds the fourth threshold. The processing proceeds to S2021 in the case where the dissolved oxygen concentration G(t) exceeds the fourth threshold. Otherwise, the processing proceeds to S2030. The fourth threshold is a threshold used for the determination after print operation, which has a lower value than the third threshold used for the determination in the course of print operation as has also been described in the second embodiment. In the meantime, the fourth threshold has a lower value than the second threshold used for the determination in the case where the suspension history is not present as will be described later.

In S2021, the print controller 202 determines whether or not the suspension history is present. The processing proceeds to S2022 in the case where the suspension history is present. Otherwise, the processing proceeds to S2025. The processing in S2022 and S2023 is the same as the processing in S1313 and S1314. Following S2023, the print controller 202 executes the bubble removal circulation in S2024. Specifically, the print controller 202 executes the bubble removal circulation without performing the temperature control of the print head 8. The processing in S2024 corresponds to the processing in the flowchart described with reference to FIG. 19.

As described above, in this embodiment, the determination processing using the threshold (the fourth threshold) lower than the threshold (the second threshold) applicable to the case where the suspension history is not present is performed even at the time of completion of print operation as with the point in the course of print operation. In other words, if there is the suspension history, this embodiment is designed to perform the processing for moving up the timing for the deaeration and moving up the timing for bubble removal circulation operation.

In the case where the suspension history is not present as a result of the determination in S2021, the print controller 202 performs processing for comparing the dissolved oxygen concentration G(t) with the second threshold in S2025. The processing proceeds to S2022 in the case where the dissolved oxygen concentration G(t) exceeds the second threshold. Otherwise, the processing is terminated.

In the meantime, if the dissolved oxygen concentration G(t) does not exceed the fourth threshold in S2020, the print controller 202 performs determination in S2030 as to whether or not the bubble removal circulation flag is set. The processing proceeds to S2031 in the case where the bubble removal circulation flag is set, where bubble removal circulation operation shown in FIG. 19 is executed and then the processing is terminated. If the bubble removal circulation flag is not set, the processing is terminated.

As described above, in the case where the print command is received during bubble removal circulation operation, this embodiment performs print operation on the priority basis so as to reduce the time for causing the user to stand by. In the meantime, since the bubble removal circulation has not been completed, it is possible to move up the timing for the deaeration so as to execute the bubble removal circulation earlier by reducing the threshold for determining the timing for the upcoming deaeration.

Other Embodiments

The respective embodiments described above have discussed the aspect in which the dissolved oxygen concentration in ink in the circulation flow path mainly including the sub-tank 151 and the print head 8 is calculated to determine the timing for the deaeration. In the printing apparatus 1, if ink inside the sub-tank 151 is reduced, extra ink is supplied from the main tank 141 into the sub-tank 151. In other words, ink having the saturated dissolved oxygen concentration at the environmental temperature is supplied into the sub-tank 151. Accordingly, in the case where ink is supplied from the main tank 141, it is preferable to calculate the dissolved oxygen concentration G(t) after the supply while considering an ink amount I supplied from the main tank 141 and then to update the dissolved oxygen concentration G(t) in the RAM 204. To be more precise, this dissolved oxygen concentration G(t) may be calculated in accordance with the following Formula 7:

$$G(t)=(G(t-1)\times(200-I)+Gs\times I)/200 \quad \text{(Formula 7)}.$$

Figure 21:
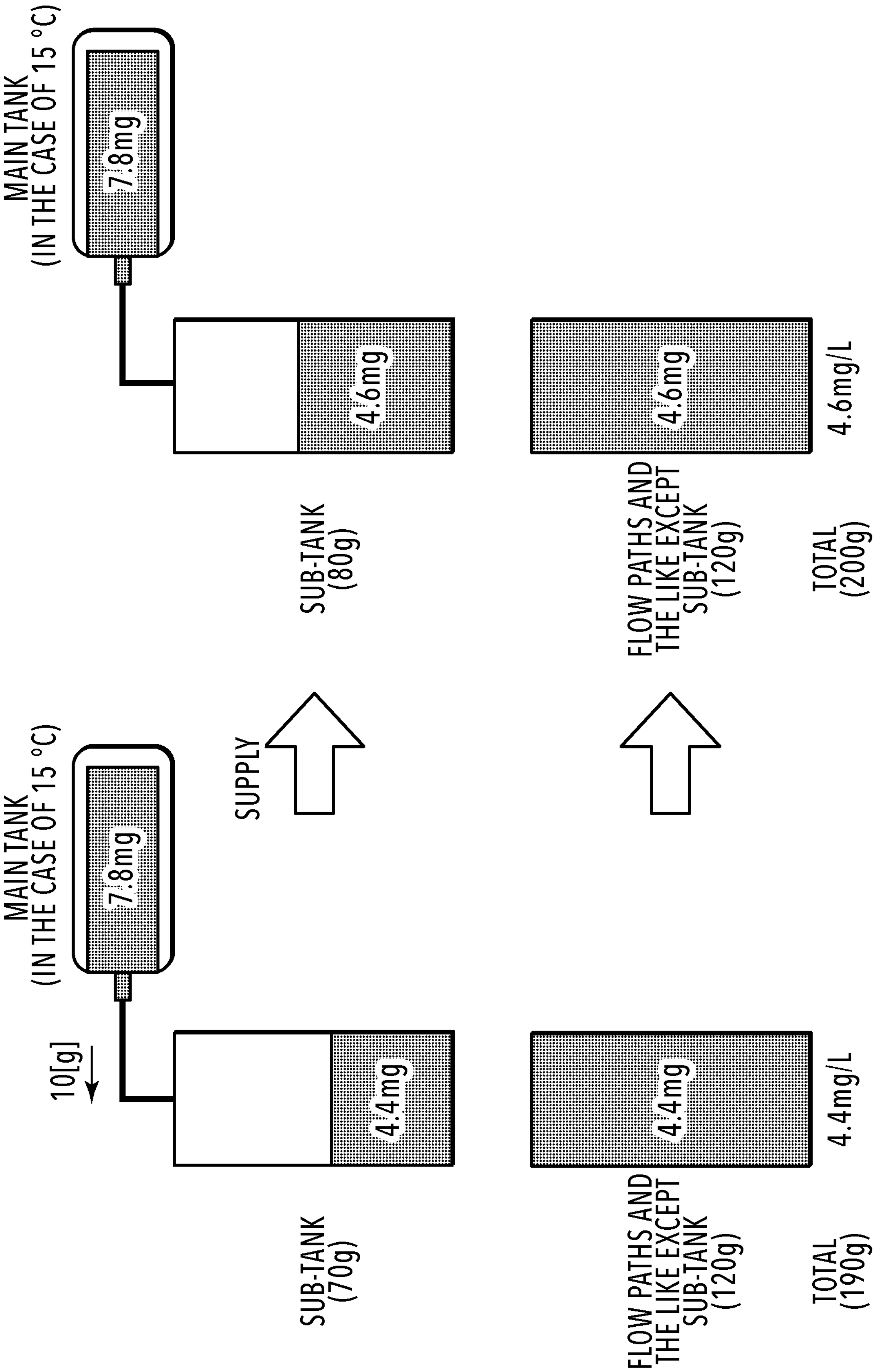
FIG. 21 is a diagram schematically showing the dissolved oxygen concentration at the time of supplying ink to the sub-tank.

FIG. 21 schematically illustrates the dissolved oxygen concentrations at various locations in the case where ink in an amount of 10 g is supplied from the main tank 141 to the sub-tank. Ink having the saturated dissolved oxygen concentration Gs at the environmental temperature is supplied from the main tank 141 to the sub-tank 151 and is then put into circulation. Hence, the dissolved oxygen concentration in ink inside the circulation flow path including the sub-tank 151 and the print head 8 is homogenized.

The respective embodiments described above have discussed oxygen as the example of the dissolved gas. However, a gas other than oxygen may be dissolved instead. Specifically, the dissolved oxygen concentration (the amount of dissolved oxygen) to be calculated may be replaced by a dissolved gas concentration (an amount of dissolved gas) applicable not only to oxygen but also to various gases soluble to ink. That is to say, the present invention is applicable to an aspect of calculating the amount of dissolved gas and comparing the amount of the dissolved gas with a threshold.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-189630, filed Oct. 5, 2018, which is hereby incorporated by reference wherein in its entirety.

What is claimed is:

1. A printing apparatus comprising:

a first flow path configured to supply liquid from a tank, which stores the liquid, to a print head which ejects the liquid based on print data to perform print operation and which has a heating unit configured to heat the print head;

a circulation unit configured to establish a circulating state in which the liquid is put into circulation in a circulation path including at least of a part of the first flow path, and to establish a stopped state in which the circulation of the liquid in the circulation path is stopped;

a control unit configured to cause the circulation unit to perform first circulation operation to circulate the liquid while the print head is heated by the heating unit and to perform second circulation operation while the print head is not heated by the heating unit.

2. The printing apparatus according to claim 1, wherein the circulation unit performs the first circulation operation while the print head ejects liquid.

3. The printing apparatus according to claim 1, wherein circulation unit performs the first circulation operation while the print head performs printing operation.

4. The printing apparatus according to claim 1, wherein the circulation unit performs the second circulation operation after the printing operation is finished.

5. The printing apparatus according to claim 1, wherein the circulation unit performs the second circulation operation in a state where the print head does not eject liquid.

6. The printing apparatus according to claim 1, wherein the print head includes an ejection port, a printing element for generating energy used for ejecting the liquid, and a pressure chamber which is an area facing to the printing element, the ejection port ejecting the liquid supplied through the pressure chamber, and wherein the circulation path includes the pressure chamber.

7. The printing apparatus according to claim 1, comprising:

a second flow path configured to flow liquid so that liquid passing through the first flow path flows again to the first flow path, wherein the circulation path includes at least of a part of the second flow path.

8. The printing apparatus according to claim 7, wherein the second flow path flows liquid so that liquid passing through the first flow path and the print head flows again to the first flow path.

9. The printing apparatus according to claim 6, comprising a second flow path configured to flow liquid so that liquid passing through the first flow path and the pressure chamber of the print head flows again to the first flow path, wherein the circulation path includes at least of a part of the second flow path.

10. The printing apparatus according to claim 1, wherein the circulation path includes the tank.

11. The printing apparatus according to claim 1, comprising a main tank configured to store liquid for supplying the liquid to the tank.

12. The printing apparatus according to claim 1, comprising a deaeration unit configured to perform dearation operation to deaerate the liquid inside the circulation path.

13. The printing apparatus according to claim 12, wherein the deaeration unit deaerates the liquid inside the tank.

14. The printing apparatus according to claim 12, wherein the circulation unit performs the second circulation operation after the dearation operation.

15. A control method of a printing apparatus including a first flow path configured to supply liquid from a tank, which stores the liquid, to a print head which ejects the liquid based on print data to perform print operation and which has a heating unit configured to heat the print head, and a circulation unit configured to establish a circulating state in which the liquid is put into circulation in a circulation path including at least of a part of the first flow path, and to establish a stopped state in which the circulation of the liquid in the circulation path is stopped, the control method comprising:

causing the circulation unit to perform first circulation operation to circulate the liquid while the print head is heated by the heating unit and causing the circulation unit to perform second circulation operation while the print head is not heated by the heating unit.

16. The control method according to claim 15, wherein the first circulation operation is performed while the print head ejects liquid.

17. The control method according to claim 15, wherein the first circulation operation is performed while the print head performs printing operation.

18. The control method according to claim 15, wherein the second circulation operation is performed after the printing operation is finished.

19. The control method according to claim 15, wherein the second circulation operation is performed in a state where the print head does not eject liquid.

* * * * *